United States Patent
Guissin

(10) Patent No.: US 9,661,239 B2
(45) Date of Patent: May 23, 2017

(54) SYSTEM AND METHOD FOR ONLINE PROCESSING OF VIDEO IMAGES IN REAL TIME

(71) Applicant: Digital Makeup LTD, Tel Aviv (IL)

(72) Inventor: Rami Guissin, Beit Yanai (IL)

(73) Assignee: Digital Makeup Ltd. (IL)

( * ) Notice: Subject to any disclaimer, the term of this patent is extended or adjusted under 35 U.S.C. 154(b) by 29 days.

(21) Appl. No.: 14/784,529

(22) PCT Filed: Jun. 5, 2013

(86) PCT No.: PCT/IL2013/050485
§ 371 (c)(1),
(2) Date: Oct. 14, 2015

(87) PCT Pub. No.: WO2014/170886
PCT Pub. Date: Oct. 23, 2014

(65) Prior Publication Data
US 2016/0065864 A1    Mar. 3, 2016

Related U.S. Application Data

(60) Provisional application No. 61/812,888, filed on Apr. 17, 2013.

(51) Int. Cl.
*H04N 5/228* (2006.01)
*H04N 9/64* (2006.01)
(Continued)

(52) U.S. Cl.
CPC .............. *H04N 5/272* (2013.01); *G06T 5/008* (2013.01); *G06T 5/20* (2013.01); *G06T 5/40* (2013.01);
(Continued)

(58) Field of Classification Search
CPC .............. G06K 9/00771; G06K 9/3233; G06T 2207/10016; G06T 7/20;
(Continued)

(56) References Cited

U.S. PATENT DOCUMENTS 5,764,306 A    6/1998  Steffano
6,271,890 B1   8/2001  Tamir et al.
(Continued)

FOREIGN PATENT DOCUMENTS

WO    2013084233 A1    6/2013

OTHER PUBLICATIONS

International Search Report and Written Opinion mailed Sep. 17, 2013 in corresponding application PCT/IL2013/050485 filed Jun. 5, 2013.

*Primary Examiner* — Trung Diep
(74) *Attorney, Agent, or Firm* — Burns & Levinson LLP; Joseph M. Maraia

(57) ABSTRACT

The invention is directed to real-time processing of video data. In some examples at least one image of the video data is processed utilizing reference data comprising reference image data of background within a region of interest and clutter image data indicative thereof, to determine a pixel deviation level of each pixel in the at least one image and generate pixel-deviation image data indicative thereof. The pixel-deviation image data is processed to enhance its tonal pixel distribution and generating enhanced image data, which is processed to determine a threshold level based on the tonal pixel distribution. A binary image map is then generated using the determined threshold level, the binary image map being indicative of the background and foreground components of the at least one image.

22 Claims, 28 Drawing Sheets

(51) Int. Cl.
*H04N 5/272* (2006.01)
*G06T 5/50* (2006.01)
*G06T 5/00* (2006.01)
*G06T 7/00* (2017.01)
*G06T 5/20* (2006.01)
*G06T 5/40* (2006.01)
*G06T 11/60* (2006.01)
*G06T 7/11* (2017.01)
*G06T 7/194* (2017.01)

(52) U.S. Cl.
CPC .............. *G06T 5/50* (2013.01); *G06T 7/0081* (2013.01); *G06T 7/11* (2017.01); *G06T 7/194* (2017.01); *G06T 11/60* (2013.01); *G06T 2207/10016* (2013.01); *G06T 2207/10024* (2013.01); *G06T 2207/20144* (2013.01); *G06T 2207/20221* (2013.01)

(58) Field of Classification Search
CPC .. G06T 2207/10024; G09G 2320/0233; G09G 2320/029; G09G 2320/0295; G09G 2320/045; G09G 2360/142; G09G 2360/147; G09G 3/3233; H04N 5/367
USPC .............................................. 348/208.4, 652
See application file for complete search history.

(56) References Cited

U.S. PATENT DOCUMENTS

| | | | |
|---|---|---|---|
| 6,288,703 B1 | 9/2001 | Berman et al. | |
| 6,909,806 B2 | 6/2005 | Li | |
| 7,095,134 B2* | 8/2006 | Sauer | H02J 1/00 290/7 |
| 7,190,845 B2* | 3/2007 | Iida | G06T 5/008 348/180 |
| 7,660,463 B2* | 2/2010 | Blake | G06K 9/00624 382/173 |
| 8,115,818 B2* | 2/2012 | Sawada | G03B 7/28 348/208.12 |
| 8,373,776 B2* | 2/2013 | Iijima | H04N 5/217 348/239 |
| 2011/0199489 A1* | 8/2011 | Fischer | H04N 5/33 348/164 |
| 2013/0063556 A1* | 3/2013 | Russell | H04N 13/026 348/42 |

* cited by examiner

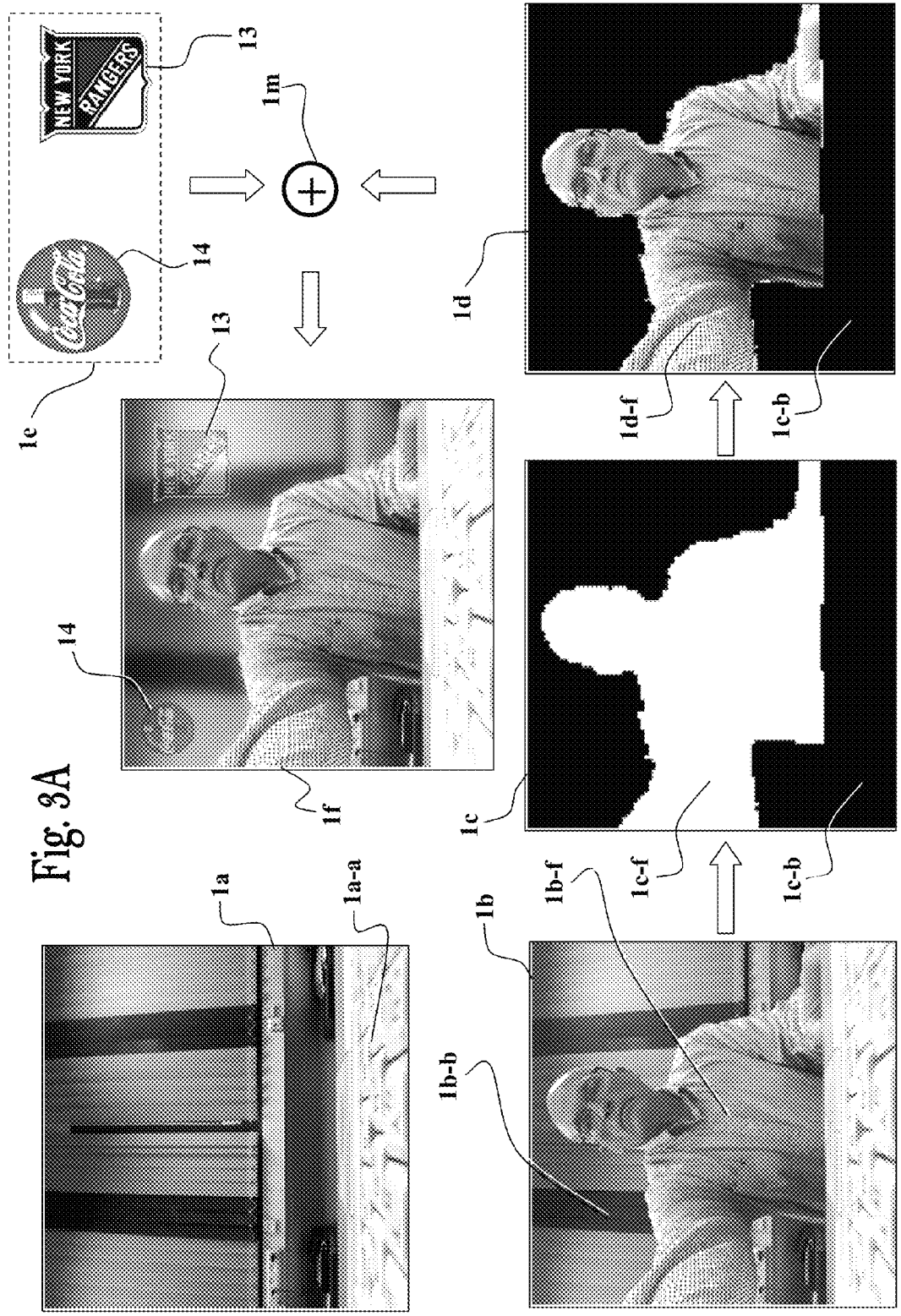

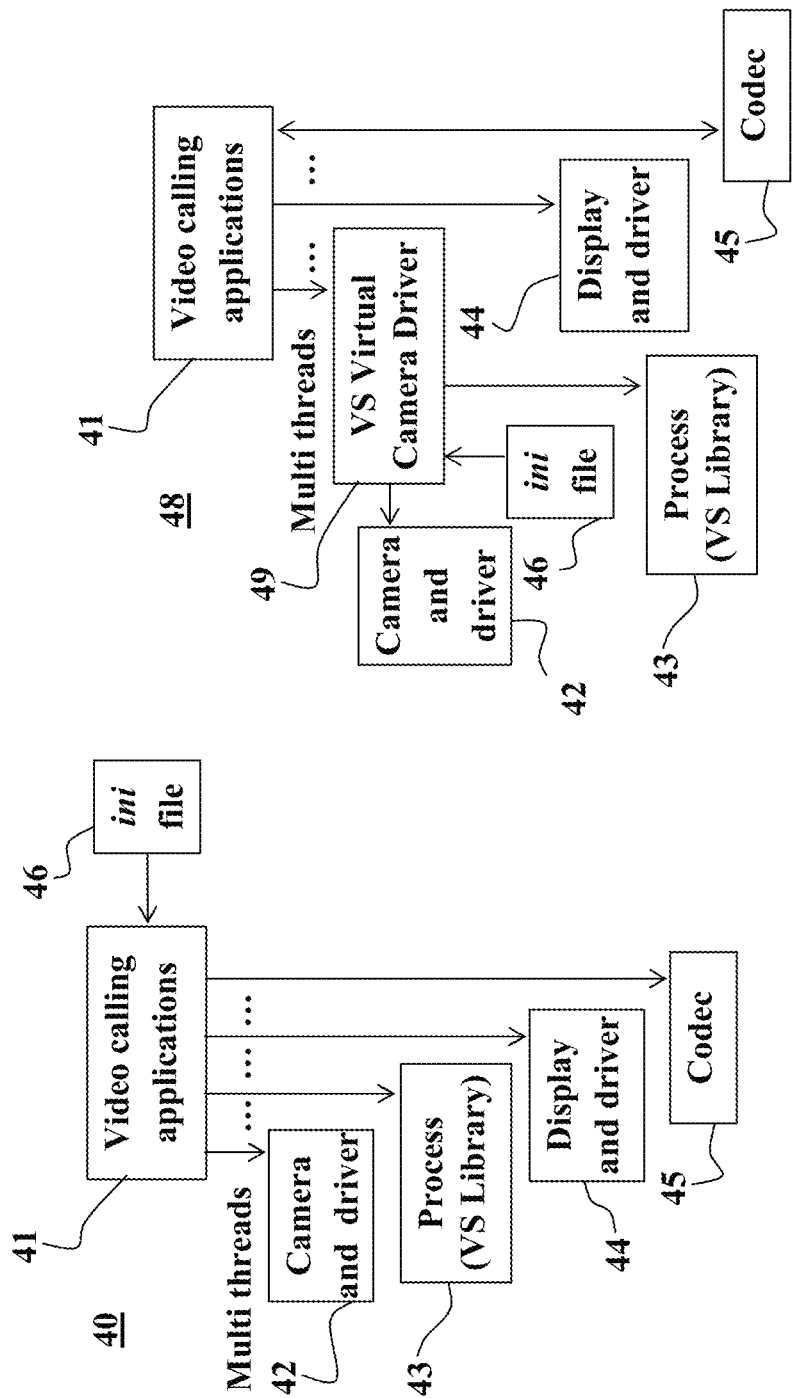

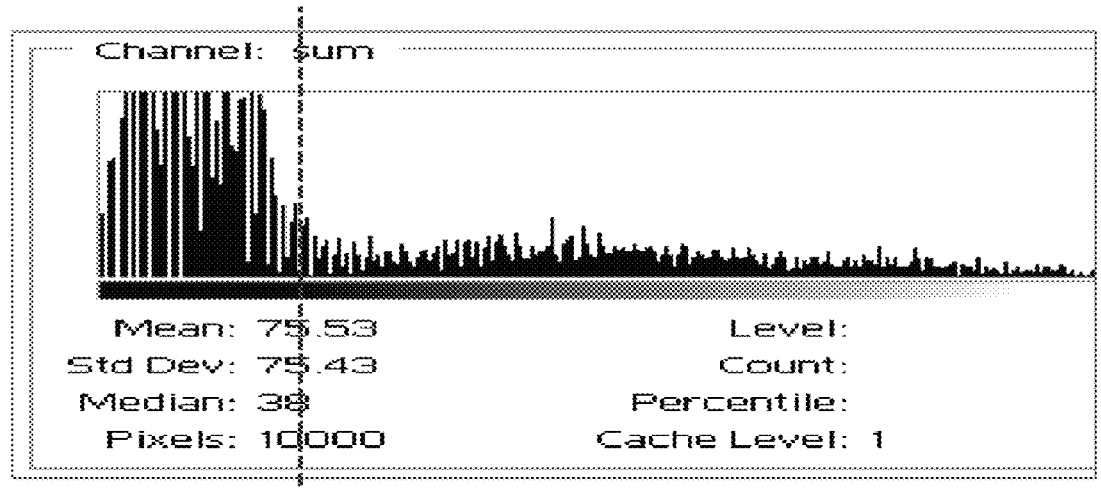
Fig. 5M
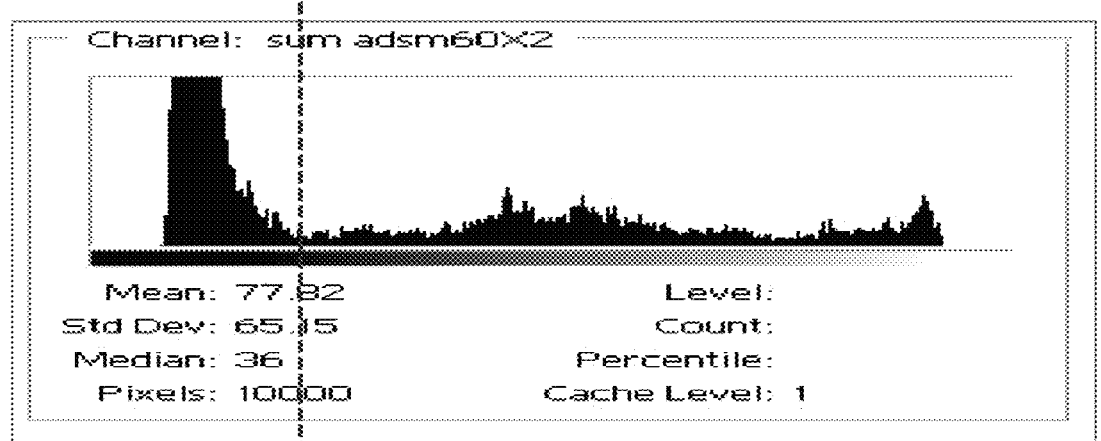
Fig. 5N
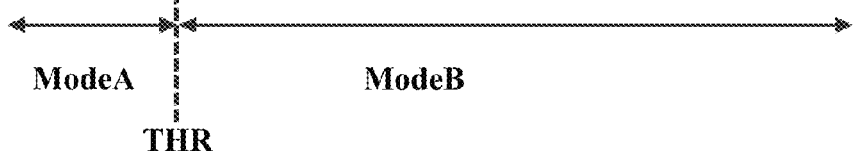
ModeA     ModeB
   THR

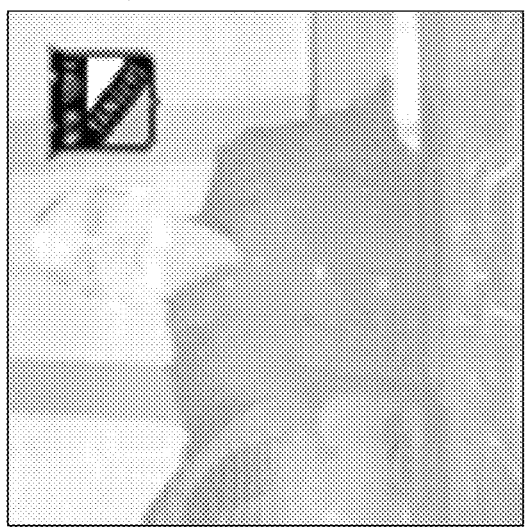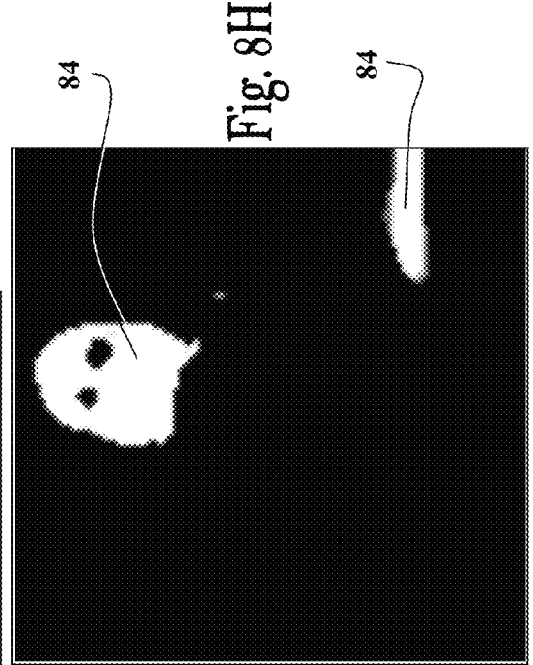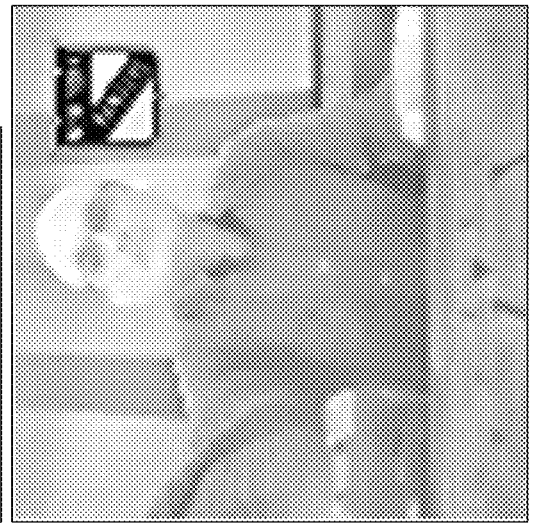

ModeA ◄──────►◄──►  ModeB

THR

77

SYSTEM AND METHOD FOR ONLINE PROCESSING OF VIDEO IMAGES IN REAL TIME

CROSS-REFERENCE TO RELATED APPLICATIONS

This application is a U.S. national phase application under 35 U.S.C. 371 of co-pending International Application No. PCT/IL2013/050485, filed on Jun. 6, 2013. The International Application, in turn, claims priority to U.S.Provisional Application No. 61/512,888, filed on Apr. 17, 2013. The entire contents of the above applications are incorporated herein by reference for all purposes.

TECHNOLOGICAL FIELD AND BACKGROUND

The present invention is in the field of image and video processing, and may be usable for implementing desktop and mobile virtual studio applications (e.g., video conferencing and video calling).

Virtual studios are widely used in the high end professional TV broadcast industry. Such real time applications often use professional TV cameras, illumination setups and chroma keying (e.g., green screen processing techniques) for differentiating between foreground (FG) objects (e.g., humans, furniture) and scene background (BG), for illumination nonuniformity correction, and suchlike. Generally, foreground figures and objects are rendered as photographed in real time, while backgrounds are overlaid by graphic information, video streams and advertisements in real time or near real time. Recorded footage is often also post processed offline by post production processes in preparing said material for broadcast.

Live processing of video shots in real time is a difficult and resource consuming task, particularly due to the vast amount of data that needs to be processed within very short time periods. There been several attempts to provide techniques for processing video streams in real time. The following patent publications suggest possible solutions for real time processing of video images.

U.S. Pat. No. 7,660,463 discloses a technique for extraction of a portion of a scene without requiring excessive user interaction. In this publication the extraction is achieved by using iterated graph cuts. The method used includes segmenting an image into a foreground portion and a background portion (e.g., where an object or desired portion to be extracted is present in the foreground portion) and determining the properties corresponding to the foreground and background portions of the image. Distributions may be utilized to model the foreground and background properties. The properties may be color in one implementation and the distributions may be a Gaussian Mixture Model in another implementation. The foreground and background properties are updated based on the portions, and the foreground and background portions are updated based on the updated foreground and background properties.

U.S. Pat. No. 6,288,703 suggests a technique wherein each observed background color in an image being displayed on a monitor is identified using a cursor to select the dominant colors. Each foreground color is also identified by using the cursor as a selector. For each pixel, several candidate mattes are computed one for each background color. Each candidate matte is computed from a single background color and the set of selected foreground colors using any known method. Of the several candidate mattes, the greater of these candidates becomes the matte signal for a given pixel. If this matte is 1.0, then the pixel is part of the background. If the matte is zero, then the pixel is part of the subject. If the matte is between 1.0 and 0.0, then the pixel is in a transition area and the contribution of the background to the pixel is that pixel's matte level. A "processed foreground" is generated by removing the contribution of the background from each pixel in the image, resulting in the subject appearing against a black field. The generated candidate mattes permit the generation of processed foreground candidates, of which the smallest is the final processed foreground for a given pixel.

U.S. Pat. No. 6,271,890 suggests using a chromokeying panel, including a plurality of first and second locations, in conjunction with a chromakeying system. Each of the first and the second locations has a color within the color of a color keying spectrum of the chromakeying system. In addition, each of the first and the second locations are arranged to define a coded pattern for a computation of a perspective of the chromakeying panel with respect to a camera independently in each video field produced by the camera. The coded pattern may include a plurality of straight lines that intersect to define vertices. The plurality of straight lines may be spaced apart from each other so that for a given vertex, a ratio of the distance of one of the lines extending from the given vertex to a first adjacent vertex, to the distance of another of the lines from the given vertex to a second adjacent vertex is unique.

In US Patent publication No. 2003/152285 suggests a techniques in which chrominance, color saturation and color intensity of an actual pixel (P1) are approximated directly from associated YUV values (alpha, a, b) which leads to the avoidance of time-consuming calculations. The recognition of rapid deviations in illumination carried out in the YUV color space is based upon the approximation of a chrominance difference by an angle difference (alpha1-alpha2) of the pixels (P1, P2) to be compared, preferably in a plane (U, V) of the YUV color space. This proceeds on the assumption that the chrominance of a pixel at the occurrence of shadows and brightenings remains constant in spite of varying color saturation and color intensity. The suggested method may be supplemented by a rapid decision program including additional decision parameters which excludes complex calculations of angle operations and separation error, even at significant deviations in illumination.

U.S. Pat. No. 5,764,306 suggests a method allowing real-time replacement of the designated background portion of an incoming video signal with an alternate background. The method utilizes the actual background image for reference as the basis for determining the background and foreground elements within the image with the end result being comparable to traditional blue-screen processes, such as chroma-key and ultimate technology, but requiring only a personal computer, video camera and the software. In this case, however, the reference background image can be any reasonably static scene with a sufficient and stable light source captured by the camera. The video data stream is modified in real-time by comparisons against the reference background image and is then passed on to its original destination. Multiple signal-noise processing algorithms are applied in real-time against the signal to achieve a visually acceptable matte.

GENERAL DESCRIPTION

There is a need in the art for novel techniques for effective online processing and manipulating of video images in real-time. Such techniques are particularly useful for such applications as video telephone calls and live video broadcast scenarios, and of course also for offline editing of video image streams. Online editing of live video is a very challenging task since specialized video shooting utilities are usually not used, due to frequent camera movements occurring during such video sessions, illumination non uniformities, and due to the substantial computational efforts associated with image processing operations.

Typically, in real time video processing applications the background of the acquired video images needs to be separated from the foreground elements of the acquired video images. This background and foreground separation permits separately editing and manipulating (e.g., overlay graphics, digital makeup, illumination correction, camera movement compensation, and suchlike) the background and foreground of the acquired images and combining them into a new modified image in which components/features of the background and/or foreground comprise modifications. The background/foreground separation of live video images is very difficult to achieve and also susceptible to separation errors and inaccuracies.

The inventor of the present invention has found that it is possible to efficiently manipulate background and/or foreground components of live video images in real time by using reference background image data (e.g., an image of the video scene taken before shooting the live video and which does not contain foreground components (e.g. from which foreground components have been removed)) to enhance tonal pixel distribution (e.g., histogram stretching, adaptive spatio-temporal filtering) in image data of the live video. The enhanced (preferably luminance and chrominance) tonal pixel distributions of imagery provide for optimal determination of a threshold value for each acquired video image and generation of a respective binary image in real time, in which the background and foreground of said acquired video image are accurately separated.

More particularly, in some embodiments, one or more background reference images are acquired before the live video session. These images are processed to generate a reference image map (also referred to herein as BRI) and clutter image map (also referred to herein as BCM) of the background. During the live video session, a pixel-level deviation image map (also referred to herein as DEV or SCR) is computed for each acquired image (I) (e.g., SCR=ABS(I−BRI)/BCM)) and then undergoes digital filtering for enhancing tonal pixel distribution of the pixel-level deviation image map thereby obtaining filtered image data from which a threshold level can be accurately determined for generating a binary image map corresponding to the pixel-level deviation image map.

The present invention, in some of its embodiments, provides a software-based, real time video processing virtual studio (VS) solution utilizing a desktop/mobile/tablet a camera (e.g., desktop/mobile/tablet/notebook camera/webcam, camcorder, professional camera), a desktop/mobile/tablet/notebook processor or any suitable data processing unit (e.g., CPUs, DSPs, FPGAs, board-level processors such as Blades, Servers, Cloud-based processing elements), and optionally a display device.

Transforming any desktop computer and mobile handset/tablet device into a virtual studio platform is useful for all video based communication platforms such as video conferencing, video calling, video messaging etc.

Furthermore, when using overlay graphics in such virtual studio footage, there is further opportunity to immerse platform-generated and/or user-generated and/or user-selected graphic personal information as well as advertisements, thereby transforming such video based communication platforms (e.g., video conferencing, video calling, video messaging) into corporate and personal revenue generating advertisement channels. Such user-generated/selected information and advertisements may be manually or automatically activated based on touchless activation (as described in more detail hereinbelow), voice recognition, optical text recognition, sound activation, context activation etc.

There is a need in the art for a novel, real time VS processing platform that can be integrated into the widely used desktop PC and mobile DSP devices and applications. The current invention provides for such an end-to-end solution, whereby each of the VS functions bring novelty to the field, and their combined functionality further enables such novel utility and effectiveness.

As will be described hereinbelow in detail the foreground background separation technique of the present invention further permits selective application of digital makeup over areas of the foreground image in which the skin (e.g., face and hands) of the user are seen. Furthermore, the techniques of the present invention are further usable for implementing touchless selection of items (e.g. logo, advertisement) immersed into the background of the image. In addition, dynamic geometrical manipulation (e.g., translation, rotation, shifting) of the items immersed/added in the background is also possible, in the events wherein said items become hidden due to movements of the user, wherein the immersed/added items are moved to new areas of the background in which they remain continuously viewable.

There is thus provided according to one aspect of the present invention a computerized system for real-time processing of video data, comprising a processor utility configured and operable to process in real time a live video session. In some embodiments the processor utility comprises a reference data module configured and operable to provide reference data comprising reference image data of background within a region of interest and clutter image data indicative thereof, a pixel deviation calculator configured and operable to receive at least one image of the video data, and process the at least one image utilizing the background reference image data and the clutter image data to determine a pixel deviation level of each pixel in the at least one image and generate pixel-deviation image data indicative thereof, a filtering module configured and operable to enhance tonal pixel distribution in the pixel-deviation image data and generating enhanced image data, a binary image generator configured and operable to process the enhanced image data and determine a threshold level based on the tonal pixel distribution, and generate a binary image map being indicative of the background and foreground components of the at least one image.

In some embodiments the reference image data module is configured and operable to receive input data of a background image of the region of interest from which foreground components were removed, generate the background reference image data, and determine pixel clutter level of each pixel in the background reference image and generate the clutter image data indicative thereof.

The filtering module may comprise a histogram stretching module configured and operable to process the pixel-deviation image data by stretching a color histogram thereof, thereby enhancing the tonal pixel distribution in the pixel-deviation image data, and/or normalizing the histograms such that image luminance and chrominance components can be weighted and summed in achieving improved performance.

In some possible embodiment the binary image generator comprises a morphological operation module configured and operable to fill holes and detach false detections.

The system may comprise an image background editing unit configured and operable to modify the background of the at least one image based on the binary image map and generate modified background image data indicative thereof. The system may additionally, or alternatively, comprise an image foreground editing unit configured and operable to modify the foreground components of the at least one image based on the binary image map and generate modified foreground image data indicative thereof. An image combining unit may be used to combine the modified background image data and the modified foreground image data and generate a modified image of the at least one image.

The reference data module may be configured and operable in some embodiments to determine the pixel clutter level using successive image filtering stages comprising a first filtering stage (e.g., spatial high pass filter, temporal high pass filter, spatio-temporal high pass filter, spatial band pass filter, temporal band pass filter, spatio-temporal band pass filter, each or all filters being adaptive or non adaptive) to attenuate low frequency components in the background image and generate filtered background image data indicative thereof, and a second filtering stage to perform temporal integration filtering operation on the filtered background image data. The reference image data module may comprise a module for determining an absolute value of each pixel in the filtered background image data for use in the second filtering stage.

In some possible embodiments the reference image data module is configured and operable to generate background reference image data using a temporal integration filter to filter the background image.

In possible applications a background manipulation module is used in the image background editing unit to perform at least one of removing, replacing and augmenting, the background of the at least one image. The image background editing unit may utilize a background illumination correction module configured and operable to generate illumination correction data usable for correcting illumination non uniformities in the background of the at least one image.

The image background editing unit may comprise in some embodiments a background stabilization module configured and operable to generate offset data indicative of background offsets induced in the at least one image due to camera movements.

In some implementations the pixel deviation calculator is configured and operable to use the offset data in the pixel deviation level computation to compensate the camera movements.

In some applications the image background editing unit comprises a background graphic overlay module configured and operable to introduce graphical items in the background of the at least one image.

The image foreground editing unit in some embodiments is configured and operable to perform digital makeup to one or more regions of the foreground. The image foreground editing unit may comprises a skin segmentation module configured and operable to identify skin regions of a user in the foreground portion of the at least one image, and selectively apply the digital makeup to said skin regions. The system may comprise touchless sensing detector configured and operable to detect body gestures of a user in the foreground of the video images towards the graphical items in the background of the at least one image.

In some applications the system the pixel deviation calculator is configured and operable to generate the pixel-deviation image data by normalization according to respective histogramic standard deviation of at least one of said luminance and Chroma components of said reference image data. For example the standard deviation may be implemented by histogramic stretching and/or factorization by predetermined gain factor.

In another aspect the invention is directed to a method for real-time processing of video data, comprising receiving reference data comprising reference image data of background within a region of interest and clutter image data indicative thereof, receiving at least one image of the video data and processing it utilizing the background reference image data and the clutter image data to determine a pixel deviation level of each pixel in the at least one image and generate pixel-deviation image data indicative thereof, processing the pixel-deviation image data to enhance its tonal pixel distribution and generating enhanced image data, processing the enhanced image data and determining a threshold level based on the tonal pixel distribution, generating a binary image map being indicative of the background and foreground components of the at least one image, manipulating at least one the background and foreground components.

BRIEF DESCRIPTION OF THE DRAWINGS

In order to understand the invention and to see how it may be carried out in practice, embodiments will now be described, by way of non-limiting example only, with reference to the accompanying drawings, in which like reference numerals are used to indicate corresponding parts, and in which:

FIGS. 1A and 1B exemplify implementations and applications of the present invention according to some possible embodiments, wherein FIG. 1A shows a possible implementation of real time video image processing of the invention and FIG. 1B exemplify use of the video processing of the present application in pre-processing and/or post-processing of a video calling or conferencing application and codecs, in accordance with some possible embodiments;

FIGS. 3A and 3B demonstrate FG-BG separation, FG enhancement and BG augmentation according to some possible embodiments;

FIGS. 4A and 4B are block diagrams exemplifying embedding of the video processing techniques of the present application in video calling applications employing a video camera, camera driver, codec, and display, according to some possible embodiments;

FIGS. 8A to 8I demonstrate a process for subsequent FG-BG separation and FG skin segmentation, according to some possible embodiments, usable for digital makeup applications;

DETAILED DESCRIPTION OF EMBODIMENTS

There is an increasing need in lower end narrowcast and podcast applications (e.g., running on internet platforms) for virtual studio functionalities that may be used without green screen or specialized equipment, such as professional video cameras and illumination accessories. Moreover, such virtual studio functionalities may also be used in desktop/mobile video conferencing and video calling applications, whereby users and service providers may benefit from such functions, thereby improving and enriching the user experience, as well as enabling dynamic graphic overlay and image enhancements.

Transforming any desktop computer and/or mobile handset device (e.g., laptop computer, smartphone, tablet, PDA, and suchlike) into a VS platform is useful for all video based communication platforms such as video conferencing, video calling, video messaging and the like.

The present invention provides for a software-based, or combined software-hardware-based, real time, video processing VS solution. In some embodiments the real time video processing is used as part of a system comprising a camera (e.g., desktop/mobile camera, webcam, camcorder, professional camera), a processor or any suitable computerized device (e.g., CPUs, DSPs, FPGAs, board-level processors such as Blades, Servers, Cloud-based processing elements), and a video output unit for outputting the processed video stream for display and/or for transmission to a remote location for display, storage, and/or further processing.

Figure 1A:
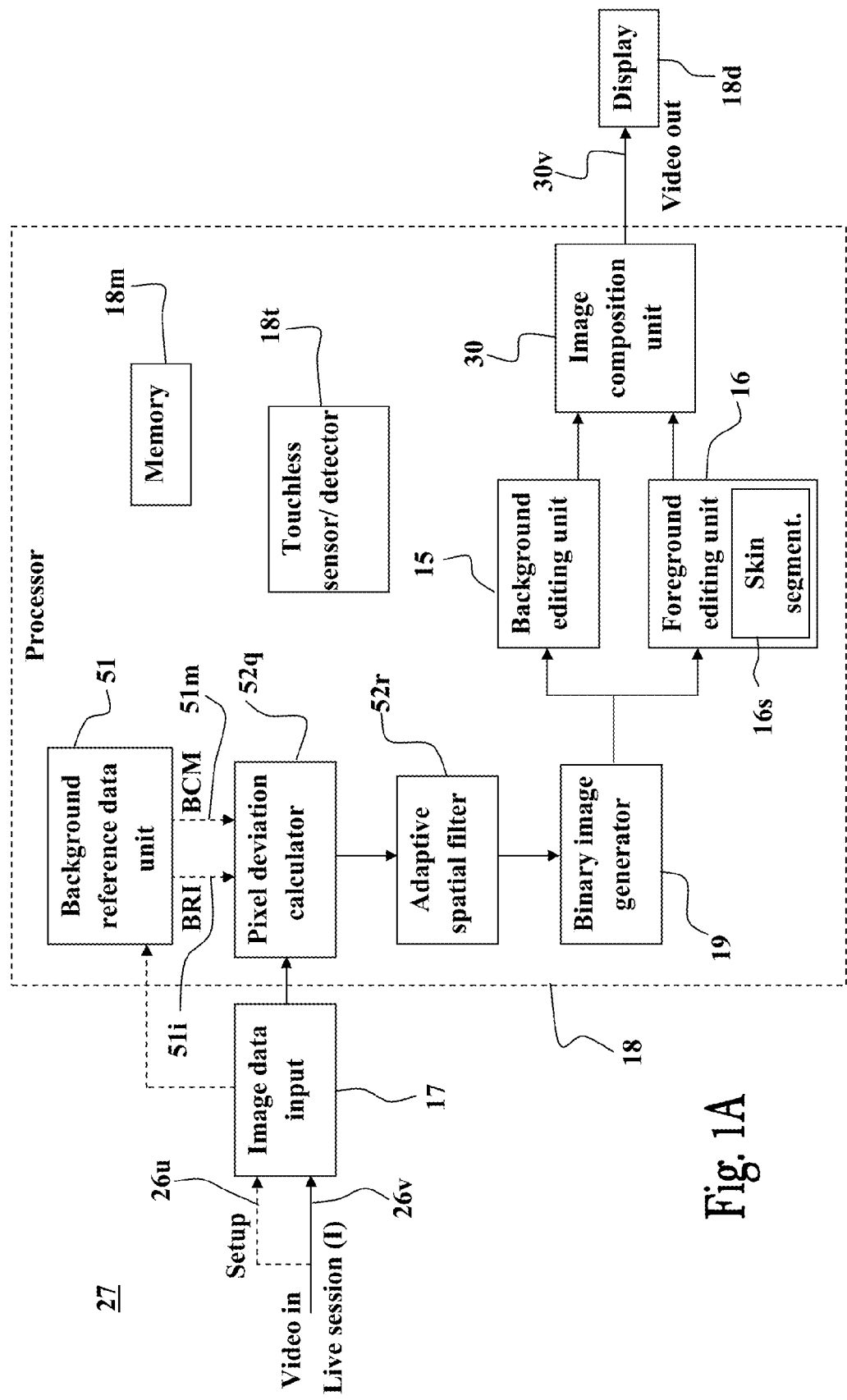

FIG. 1A is a block diagram of a real time video image processing system 27 according to some possible embodiments of the present invention. In general, the video processing system 27 comprises an image data input unit 17 for capturing video images (e.g., from a video camera) a data processor 18 and a memory 18m configured and operable to process video images of the image data input 17 and generate respective output video image data 30v in which the background and/or the foreground of the captured video images been modified/manipulated, and a display device 18d to display the output video images 30v.

The image data processing might include a setup step (indicated by dashed arrowed lines) in which the image input unit 17 is used to acquire one or more images 26u (also referred to herein as setup images) of a region of interest of the background. The acquired setup images 26u are received and processed by the processor 18 to generate background reference image data to be used thereafter to process the video images 26v acquired during the live video session. The background reference image data may be stored in the memory 18m for later use whenever a live video session is performed.

The processor 18 comprises a background reference data unit 51 for generating the background reference data, a pixel deviation calculator 52q for determining pixel-deviation level of each pixel in the live video session images 26v and generating for each image 26v pixel-deviation level image data indicative thereof, an adaptive spatial filter 52r for enhancing tonal distribution of the pixel-deviation level image and generating filtered image data for each image 26v, and a binary image generator using the filtered image data for generating a binary image map for each image 26v.

The background reference data unit 51 is configured and operable to process the setup images 26u to generate a background reference image map (BRI) 51i and a background clutter image map (BCM) 51m indicative of a clutter level of each pixel in the background image data. The background reference image data, BRI 51i and BCM 51m, is used by the pixel deviation calculator 52q to determine pixel-deviation level in the live session video images 26v. In possible embodiments the background reference image data, BRI 51i and BCM 51m, is a preset data provided in the memory 18m for future use in the system 27, and in such implementations the background reference data unit 51 is not required and thus may be removed from the system 27. In alternative implementations where the background is expected to change over time, the BRI 51i and BCM 51m are continuously computed and updated in the corresponding background image regions.

The processor 18 further comprises a background editing unit 15, a foreground editing unit 16, and an image composition unit 30 configured and operable to use image data from at least one of the background and foreground editing units, 15 and 16 respectively, for generating the video output images 30v. The background editing unit 15 is configured and operable to modify/manipulate the background of the video images 26v, as indicated by respective binary image data from the binary image generator 19. A foreground editing unit 16 may be also used to modify/manipulate (e.g., digital makeup) the foreground of the video images 26v, as indicated by the respective binary image data from the binary image generator 19, In some embodiments the foreground editing unit 16 comprises a skin segmentation module 16s configured and operable to identify skin regions of a user in the foreground portion of the video images, and selectively modify/manipulate the identified skin regions. The skin segmentation module 16s may be configured to provide skin-tone (e.g. color based) segmentation by computing certain pixel color features, adaptively smoothing and combining them, and subsequently applying a threshold for segmenting such skin regions in the foreground part of the image.

In some embodiments the processor further comprises a touchless sensing and activation detector 18t configured and operable to detect body gestures of a user in the foreground of the video images 26v towards graphical items immersed/added to the background of the output video images 30v, and provide responsive indications accordingly. More particularly, the output video images 30v comprising immersed/added objects are displayed to the user in a display device (18d) of the video processing system and the user may move her hands (or other body parts) towards items immersed/ added in the background of the output video images 30*v* to request that information regarding these items be provided. The system 27 may be therefore configured to fetch the information requested by the user (e.g., from memory 18*m* or via the Internet) in response to indications generated by the touchless sensing and activation detector 18*t*.

Figure 1B:
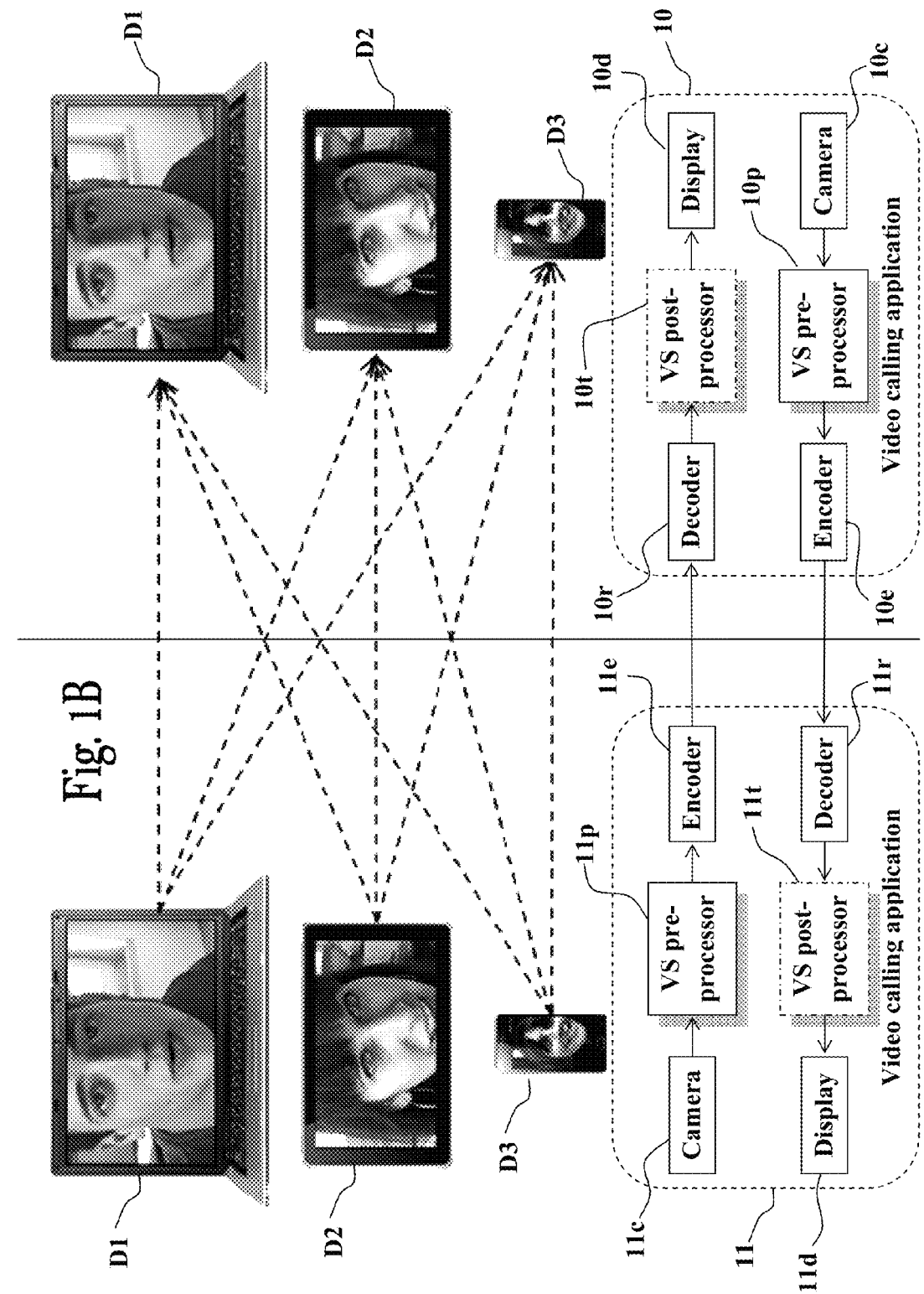

FIG. 1B exemplifies possible real time video processing applications (e.g., providing VS functionalities) of the present invention in video calling applications, 10 and 11. For example and without being limiting, the video calling applications 10 and 11 may be utilized in video communication implementations (e.g., video calling, video conferencing, video messaging). As seen, the real time video processing techniques are incorporated in pre-processor stages, 10*p* and 11*p*, configured and operable to receive streams of video frames/images from respective video cameras, 10*c* and 10*p*, prior to encoding these video streams by respective encoders, 10*e* and 11*e*. Some of the real time video processing techniques disclosed herein may be also implemented in post-processing stages, 10*t* and 11*t*, of the video calling applications 10 and 11, after decoding the video streams by respective decoders, 10*r* and 11*r*, at the receiver side of the video communication.

As demonstrated in FIG. 1, the real time video processing techniques disclosed herein may be implemented in any device capable of acquiring and delivering live video shots, for example and without being limiting, laptop computers D1, tablets D2, and/or smartphones D3. By way of non-limiting example only, the real time video processing techniques described herein may be used for graphic overlay of advertisements. In possible embodiments the graphic overlay may be determined based only on information computed from the received imagery, and not based on the transmitter side imagery i.e., by the post-processor stages 10*t* and 11*t*.

Figure 2:
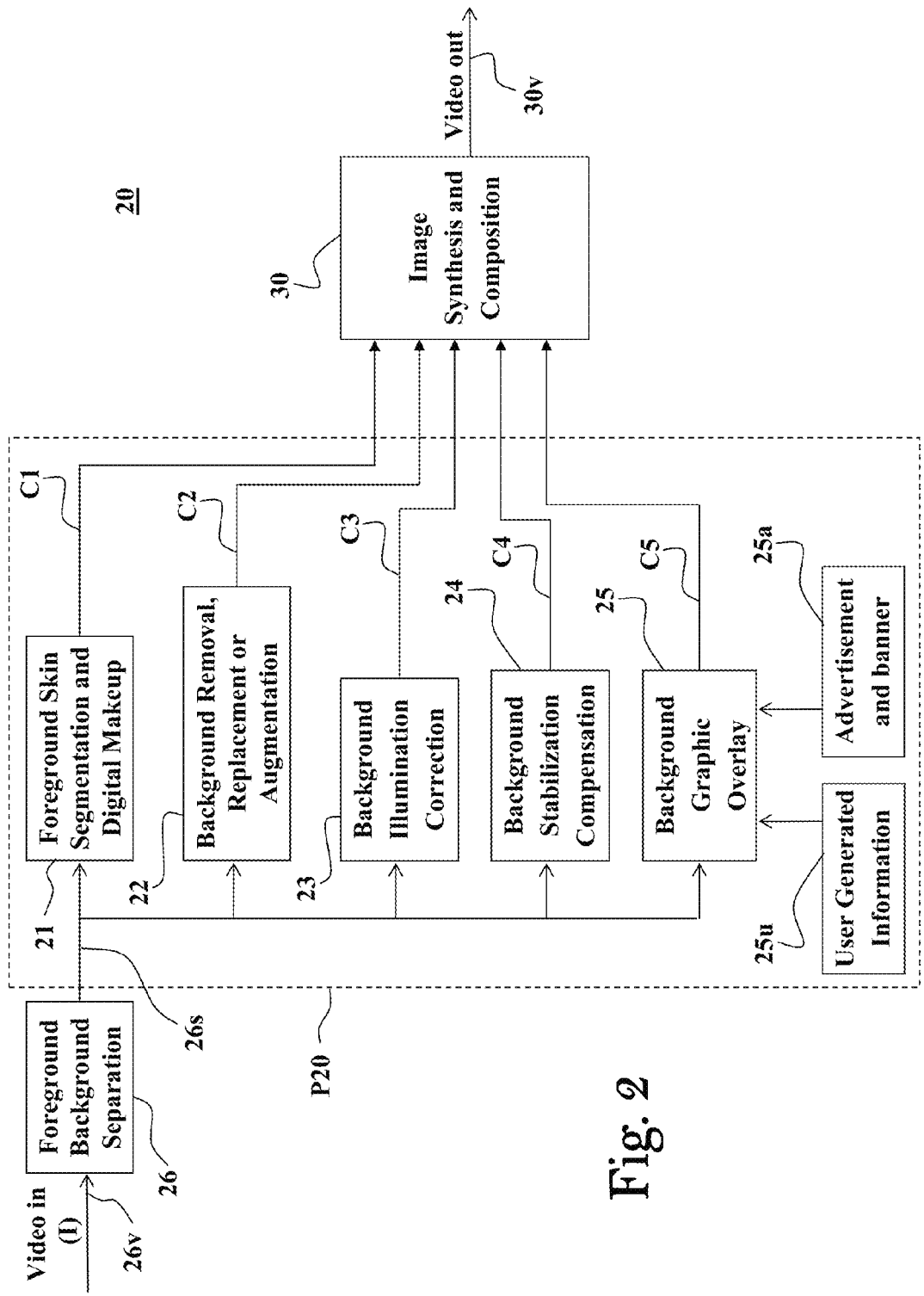
FIG. 2 is a block diagram illustrating an end-to-end video processing application in accordance with some possible embodiments.

Referring to FIG. 2, according to some possible embodiments there is provided a video processing system 20 generally comprising a foreground-background (FG-BG) separation utility 26, a set of foreground and/or background processing utilities P20, and an image synthesis and composition unit 30. The FG-BG separation utility 26 is configured and operable to separate background image data and foreground image data of each image/frame in a stream of incoming video frames 26*v*. The separated FG-BG image data 26*s* from the image separation utility 26 is then processed by a set of foreground and/or background processing utilities P20 configured and operable to manipulate the separated foreground background image data and generate image data components C1 to C5 to be used in the output video stream 30*v* outputted from the video processing unit 20.

For example and without being limiting, in some possible embodiments the FG/BG processing utilities P20 comprise a foreground skin segmentation and digital makeup utility 21, a background removal, replacement or augmentation utility 22, a background illumination correction utility 23, a background stabilization compensation utility 24, and a background graphic overlay utility 25.

In some possible embodiments the background graphic overlay utility 25 is configured and operable to access user generated data 25*u* (e.g., personalization data e.g., favorite football team, rock band) and advertisement/banner data 25*a* (e.g., database). The processed image data components C1 to C5 generated by the FG/BG processing utilities P20 are received by an image synthesis and composition utility 30 configured and operable to combine one or more of the image data components C1 to C5 into a new image in which at least one of the foreground and the background of the original image data 26*v* has been manipulated/modified. The image synthesis and composition utility 30 outputs the resulting image 30*v* for further utilization e.g., display, further processing, and/or storage. For example and without being limiting, in some embodiments the image data output 30*v* from the image synthesis and composition utility 30 is in a form of a stream of image frames usable for various video applications such as video calling, video conferencing and video messaging.

FIG. 3A exemplifies FG-BG separation as performed by the FG-BG separation utility 26 according to some possible embodiments. In this example a background setup image 1*a* is first acquired and then processed to generate the background reference image data. In addition, the FG 1*b-f* of the image data 1*b* is further enhanced by, for example and without being limiting, using a digital makeup function. As seen, images 1*b* taken during a video session (live video session) are processed and a binary mask image 1*c* is generated to allow differentiating the foreground 1*b-f* of the image 1*b* from the background 1*b-b* of the image 1*b*. In this example the foreground 1*c-f* of the binary mask 1*c* is colorized white, and its background 1*c-b* is colorized black. Using the generated image mask 1*c* the foreground 1*b-f* of the acquired image 1*b* is enhanced, as shown in image 1*d*. The background 1*b-b* of the image may be separately processed and manipulated by adding (1*m*, e.g., immersing) image items 1*e* thereinto, as exemplified in image 1*f*. For example, and without being limiting, the background 1*b-b* of the image 1*b* may be manipulated by blurring (or for example replacing) the regions of the background, and/or adding thereinto icons (e.g., advertisements, logos) 14 and/or personalization/favorites (logos, banners) image elements 13.

As seen in image 1*f* the background of the acquired image 1*b* is smoothed and augmented/manipulated with user (or platform) selectable and dynamic graphic/image/video/3D items of personal favorites and/or advertisements items 13/14. The added items 13/14 are typically added/overlaid in the BG of images (1*b*) of a video stream, such that the FG portions (1*b-f*) of the images may occasionally obscure the overlaid information (13/14).

Figure 3B:
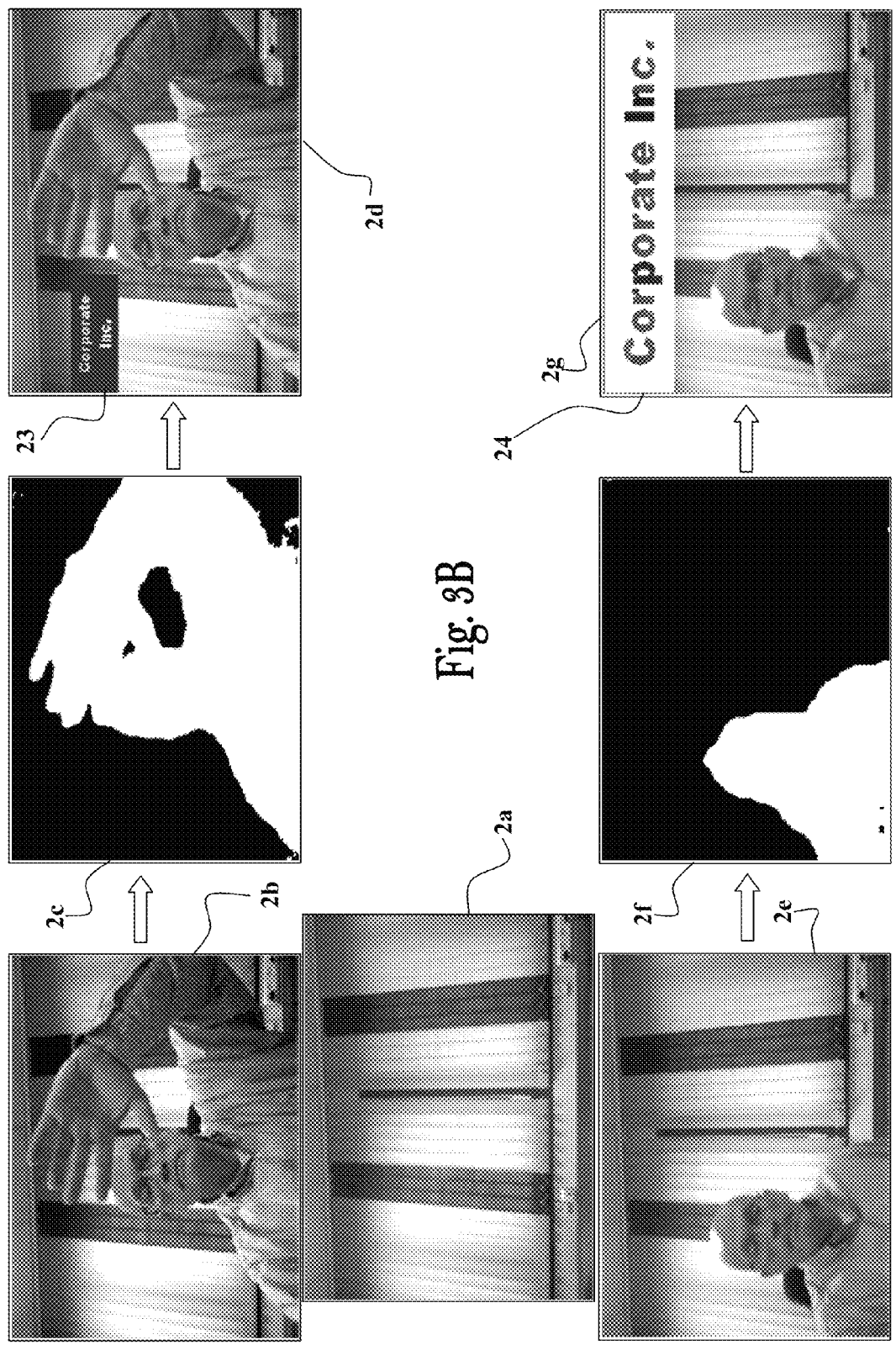

FIG. 3B shows another example of the FG-BG separation of the present invention, wherein the BG of the images 2*b/2e*, taken in two different video sessions, are augmented/manipulated with business-related (corporate information, insignia etc.) and dynamic graphic/image/video/3D elements of personal favorites and/or advertisements 23/24. FIG. 3B further exemplifies generating respective binary mask images 2*c/2f* for the acquired images 2*b/2e*. Images 2*d/2g* exemplify image data outputted after combining the image data components generated in the process. In this example, the added items (23/24) are combined in the BG of a stream of image frames (2*b/2e*) acquired during video session take, such that FG portions moving during the take may occasionally obscure the added item, or any other overlaid information.

FIGS. 4A and 4B show two exemplary video processing implementations, 40 and 48 respectively, according to some possible applications of the invention, usable for video calling applications. Typically, in video calling applications a camera and a camera driver 42 are used to acquire a stream of video images/frames, a codec 45 to compress the video stream for transmission/storage, and a display 44 for displaying it. In the video processing implementation 40 shown in FIG. 4A, the video processing is implemented as a software library 43 called by the video calling application 41, alike the camera 42, display 44, codec 45 and an initialization (ini) file 46. that is used to provides all default video processing parameters. In FIG. 4B, the video processing application 48 is implemented using a virtual camera driver 49 that is called by the video calling application 41, where the virtual camera driver 49 subsequently calls the software library 43, the camera driver 42 and accesses the ini file 46, and where the display driver 44 and codec 45 are called by the video calling application 41.

Figure 4C:
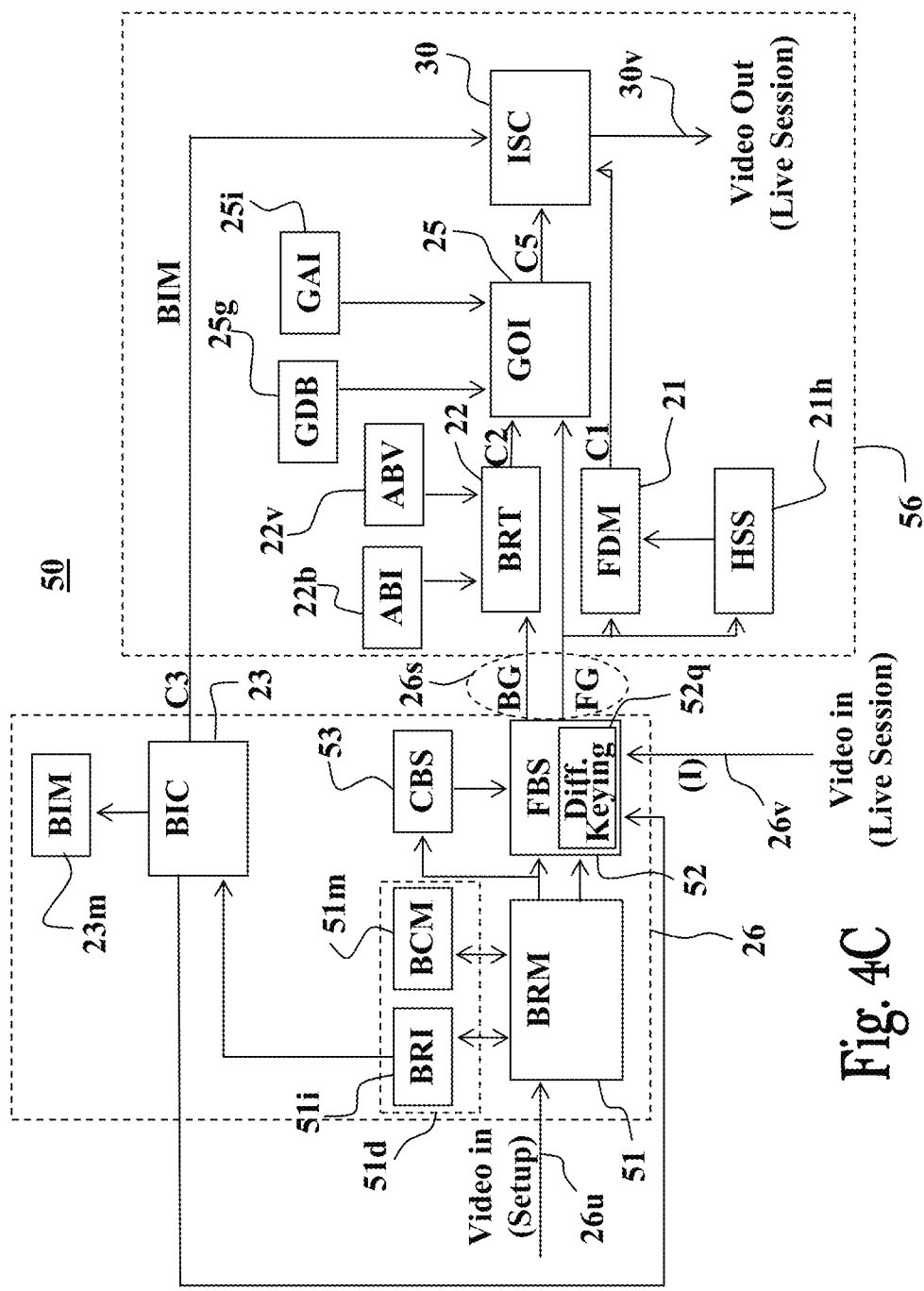
FIG. 4C is a block diagram of an end-to-end video processing solution according to some possible embodiments.

FIG. 4C is a block diagram of an end-to-end video processing unit 50 according to some possible embodiments of the present invention. The video processing unit 50 is generally a two-stage process particularly usable for a video calling/conferencing/messaging sessions wherein the camera is substantially stationary (e.g., laptop webcam on desk, video camera mounted on tripod/stand/bracket, conferencing camera on desk, mobile handset or tablet stationary on desk facing the user, and suchlike).

In general, a stream of images/frames 26v is received and processed by the video processing unit 50, and a corresponding output stream of images/frames 30v are responsively generated. In the following description operation of various components of the video processing unit 50 will be described as performed on each image of the received video stream 26v. It should be however understood that although the video processing unit 50 may process a single image at a time received at 26v, it is also configured and operable to carry out the same operations in real time on a stream of images received at 26v.

In the first stage FG and BG separation is carried out by the FG-BG separation stage 26. In some embodiments the separation stage is started in generation of background reference map (BRM) by a BRM utility 51. The BRM utility 51 receives one or more setup image 26u of the video session, from which foreground objects (e.g., the user) are displaced from the field of view of the camera. The BRM utility 51 analyses and processes the setup image 26u (e.g., images 1a and 2a in FIGS. 3A and 3B) to generate BRM data 51d comprising a BG Reference Image (BRI) data 51i and a Background Clutter Map (BCM) data 51m.

In some embodiments of the present invention the BRI data 51i is used as a reference image for foreground-background separation (e.g., utilizing a novel difference keying techniques) performed by a difference keying module 52k of a foreground-background separation (FBS) utility 52. The BRI data 51i generated by the BRM utility 51 may be therefore processed and optimized, for example and without being limiting, by spatial, temporal and spatio-temporal adaptive smoothing and artifact removal, for removing random noise and image artifacts that may impact the subsequent difference keying operation of the difference keying module 52k. Moreover, if there is any motion or temporal changes in the BG scene, they are also best removed as they will impact the accuracy of the difference keying operation.

In the process of building the BRI data 51i, a BCM data 51m is also generated by the BRM utility 51 reflecting in a pixel by pixel basis the variability measured there, thereby compensating said difference keying (52q) on a pixel by pixel basis, such that the variability may be represented by a temporal, spatial or a spatio-temporal standard deviation of measured pixel variations when building the BRI data 51i. In detection systems, for example and without being limiting, the BRI data 51i is to be considered as the "mean" of the pixel/pixel neighborhood/pixel history, while the BCM data 51m is to be considered as the "clutter deviation" of the pixel/pixel neighborhood/pixel history.

Once the operation of the BRM utility 51 is complete, the foreground (e.g., the user) may enter the field of view of the camera. For example, at this stage a user of the system may be seated in front of the camera in position for the video call, and a live real time session may be then activated, preferably prior to placing the actual call. The foreground-background separation (FBS) utility 52 is then applied to the entire image received at 26v in real time, and the FBS utility 52 generates a FG silhouette data (e.g., by identifying the silhouette of the user). Once the FG items and its silhouette are determined FG identification is generated, such that the rest of the scene can be defined as BG and corresponding BG data may be generated.

With reference to FIG. 3A, in some embodiments of the present invention the observed parts of the desktop and its articles 1a-a (e.g., keyboard, mouse, documents, pens etc.) and chair are also considered as FG items in addition to the user 1b-f. The user may define preference data comprising preferred digital makeup settings, preferred graphic favorites (25u in FIG. 2) and advertisements (25a in FIG. 2), and once the user preference data is determined they may be placed in the FG 1b-b of the video call, using any of the techniques described hereinabove and/or hereinbelow. Some, or all, of the definitions in the user preference data may be determined automatically by the system, for example and without being limited, based on time of day, caller and called party known attributes, mood, context of calling session, voice recognition activated, hand motion gesture recognition, manually covering virtually overlaid control buttons in the image, and suchlike.

Referring back to FIG. 4C, the FBS utility 52 generates binary image map data (e.g., 2c and 2f in FIG. 3B) identifying pixels of the received image 26v that constitutes the FG (e.g., user and user's silhouette), and the BG regions of the received image 26v. In some embodiments, a transition region between the FG region and the BG region is also determined, along which an accurate bounding contour is geometrically determined. For cases in which the camera may be occasionally jolted away from its original position when generating the BRM data, a camera background stabilization (CBS) utility 53 may be used to compute camera offset data indicative of the offsets induced in the received background image data 26v due to the camera movements. The computed camera offset data may be used for compensating such movements when computing the difference keying by the difference keying module 52q of the FBS utility 52.

In some possible embodiments, when the camera is intermittently moved, the scene displayed will be that of the camera in its new position. In this event the difference keying module 52k use the camera offset data generated by the CBS utility 53, being indicative of image changes (e.g., translatory and/or angular) relative to the BRI data 51i, for maintaining the accuracy of the difference keying operation. Camera vibrations are thereby measured from the BG portion of the scene to enable continuous operation in the presence of camera angular or translational changes, as identified by comparing the FG region identified by the FBS utility 52 to the BRM data (e.g., BRI data 51i) generated by the BRM utility 51.

In addition to camera motion, room illumination non-uniformities (e.g., arising from typically used desk lamps, ceiling lamps and lit windows) may be also compensated based on BG measurements. For this purpose, the background illumination correction (BIC) utility 23 receives the pre-computed BRI data 51i and generates a background illumination map (BIM) data 23m, which is utilized by the image synthesis and composition (ISC) utility 30 in reducing/correcting the illumination non uniformities in the composed image 30*v*.

In the next stage 56 the separated FG and BG image data 26*s* is processed and manipulated as described in steps 21-25 in FIG. 2, and/or as will be now described with reference to FIG. 4C.

In some embodiments the foreground digital makeup (FDM) utility 21 is configured and operable to apply digital makeup to the pixels of the FG data image, thereby providing an essential element in professional broadcast studios, especially with the increased HDTV resolution and poor illumination and shading effects, which accentuate facial imperfections. In some embodiments the FDM utility 21 applies a digital makeup (DM) function to the FG portion of the scene, thereby reducing computational complexity. Moreover, the FG silhouette may be further segmented by the FDM utility 21, to thereby provide a head and/or skin segmentation (HSS) portion data 21*h* for the DM process to operate on, and further reduce the computational load of the DM function in typical video calling/conferencing/podcasting where the user's face is small compared to the entire field if view. The DM of the FDM utility 21 may be carried out using any DM technique suitable for real time processing of video streams, such as described in international application No. PCT/IL2012/050504 of the same applicant hereof, the disclosure of which is incorporated herein by reference.

In some embodiments of the present invention a background rendering transformation (BRT) utility 22 is used to remove, or replace or augment the BG portion of the scene, and generate rendered BG data C2 resulting from the operation performed of the BRT utility 22. For example, and without being limiting, the rendered BG data C2 may be generated by the BRT utility 22 using an augmented background image (ABI) database 22*b* and/or an augmented background video (ABV) database 22*v*, or live feeds from a live source.

Graphic overlay information (GOI) functions are widely used in professional broadcast TV virtual studios. In some embodiments of the present invention, graphics overlay is dynamically immersed in the BG portions of the live video conference or video call using the GOI utility 25. For example, and without being limiting, the GOI utility 25 may be configured and operable to receive the rendered BG image data C2 generated by the BRT utility 22 and FG image data generated by the FBS utility 52, such that such graphics is overlaid on top of the BG image data C2 from the BRT 22 (and optionally partially transparent), and obscured dynamically by the changing FG image region.

As mentioned hereinabove, the overlaid graphic/image/video information used by the GOI utility 25 may be user-generated and/or user-selected, or alternatively selected and generated by the video calling application as a source of income or accreditation. Graphic personal information (25*u* shown in FIG. 2 e.g., dynamic 2D or 3D simulated graphic objects), as well as advertisements (25*a* shown in FIG. 2) may be used, thereby transforming such video based communication platforms (e.g., video conferencing, video calling, video messaging) into corporate and personal revenue generating advertisement channels. Such user-generated/selected information and advertisements may be manually or automatically activated based on touchless activation (as provided in more detail below), voice recognition, optical text recognition, sound activation, context activation, and the like.

In some embodiments the graphic objects to be overlaid by the GOI utility 25 are maintained and stored in a graphic data base (GDB) 25*g* (e.g., comprising the user generated data 25*u* and advertisement/banner data 25*a* described with reference to FIG. 2), and the overlay of the graphic objects is controlled by a graphic activation inputs (GAI) utility 25*i*. Accordingly, video calling platform providers may generate revenue from such advertisements, while users that willingly elect the usage of such advertisements to earn the right to use the video call platform/service/bandwidth for free or for a reduced price.

Finally, the image synthesis and composition (ISC) utility 30 receives the resulting processed FG and BG image data maps in C5, along with the illumination non-uniformity data map C3, thereby synthesizing and composing the final image 30*v*, and feeding the result in real time to the video calling application for compression by the codec. For example, in some embodiments the ISC utility 30 receives the manipulated FG image data C1 from the FDM utility 21, the BG manipulated image data C5 from the GOI utility 25, and the illumination non-uniformity data map C3 (i.e., the BIM 23*m*) from the BIC utility 23. It should be however understood that the FG and/or BG image data maps used by the ISC utility 30 to generate the final image 30*v* may be obtained from other components of the unit 50. For example, and without being limiting, the FG or BG image data used by the ISC utility 30 may be received without being manipulated directly from the FBS utility 53.

Figure 4D:
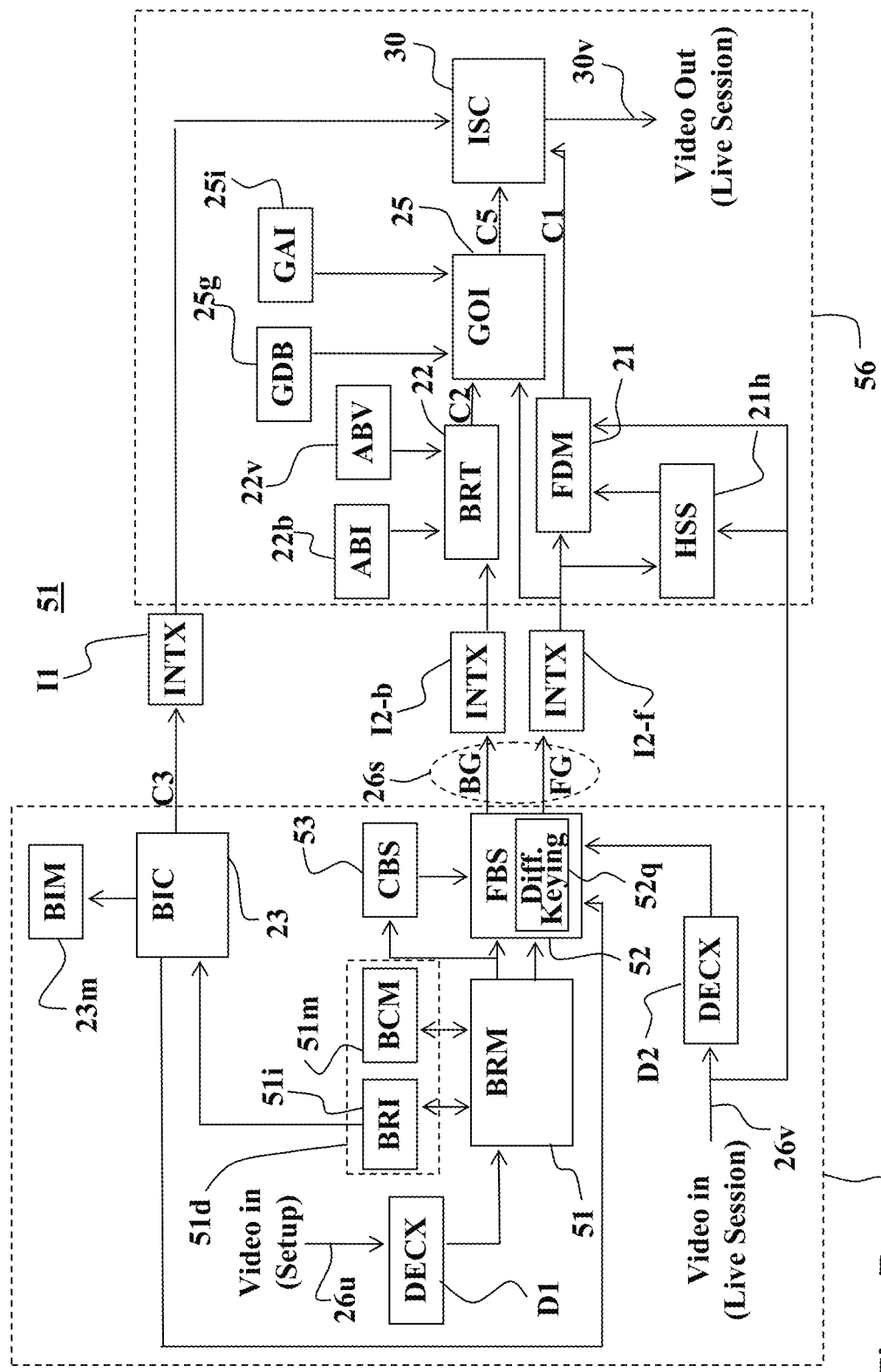
FIG. 4D is a block diagram of an end-to-end video processing solution including decimation-interpolation stages according to some possible embodiments.

FIG. 4D shows a block diagram of a video processing unit 51, which is a modification of the video processing unit 51 shown in FIG. 4C. In the video processing unit 51 the operation of the BRM 51, FBS 52, and BIC 23 utilities are performed at lower image resolution utilizing decimation modules D1 and D2 where appropriate (e.g., zero order decimation—nearest neighbor, or $1^{st}$ order decimation—bilinear), thereby reducing computational complexity and improving robustness in the face of camera artifacts, scene over resolution and slight camera vibrations.

More particularly, the setup video image(s) 26*u* acquired during the setup steps is decimated by the DECX module D1 and the decimated image data thereby generated is provided to the BRM utility 51 for further processing, the video images 26*v* acquired during the video session are decimated by the DECX module D2, and the decimated image data thereby generated is provided to the FBS utility 52 for further processing. The BIM data C3 generated by the BIM utility 23 is interpolated by the INTX module I1, and the interpolated image data thereby generated is provided to the ISC utility 30. The separated FG-BG image data 26*s* generated by the FG-BG separation stage 26 is interpolated using two interpolation modules: INTX I2-*b* used for interpolating the BG image data and provide the interpolated image data generated by it to the BRT utility; and INTX I2-*f* used for interpolating the FG image data and provide the interpolated image data generated by it to the GOI 25, FDM 21 and HSS 21*h*, utilities.

The DECX modules D1 and D2 are configured and operable to perform decimation operation with ratio X (e.g., the decimation ratio X may generally range between 1/4 to 1/10), and the respective INTX modules I1 and I2-*b*/I2-*f* are configured and operable to interpolate (e.g., zero order decimation—nearest neighbor, or $1^{st}$ order decimation—bilinear) with the same ratio X. For example, and without being limiting, for an HD format 1920×1080, a DECX D1 with X=10 may be used to provide the BRM 51, FBS 52, and BIC 23 utilities a decimated 192×108 size image, which constitutes a considerable computational saving and enables real time implementations on embedded, preferably software-based processors (e.g., CPUs, DSPs).

Figure 4E:
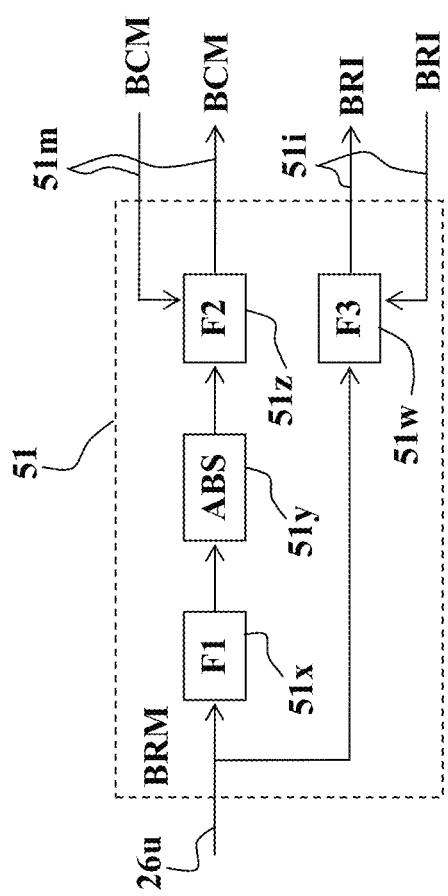
FIG. 4E is a block diagram of a BRM utility usable in end-to-end video processing implementations according to some possible embodiments.

FIG. 4E is a block diagram exemplifying an implementation of the BRM utility 51 according to some possible embodiments. In this example the BRM utility 51 is configured and operable to generate two image data outputs, namely the BCM image data 51*m* and the BRI image data 51*i*. The background clutter map BCM image data 51*m* represents localized image deviation measures, and is preferably computed by applying two consecutive image filtering stages. In the first filtering stage a filter module (F1) 51*x* is used to filter the acquired setup video image 26*u*, where the filter module (F1) 51*x* may be implemented as one of the following filters: (i) Spatial High Pass Filter (SHPF), (ii) Temporal High Pass Filter (THPF), (iii) Spatio-Temporal High Pass Filter (STHPF), (iv) Spatial Band Pass Filter (SBPF), (v) Temporal Band Pass Filter (TBPF), or a (vi) Spatio-Temporal Band Pass Filter (STBPF). The (F1) filtered setup video image is processed by a ABS module 51*y* configured and operable to determine absolute value of each pixel in the filtered image data and generate non-negative representation of the (F1) filtered data. The non-negative representation of the (F1) filtered data is then filtered by a second filtering stage (F2) 51*z*, which be configured and operable to implement a Temporal Integration Filter (TIF) or a spatio-temporal Integration Filter (STIF).

The BRM utility 51 generates the BRI image data 51*i* by applying an additional (F3) filtering module 51*w* to the acquired setup image data 26*u*. The additional (F3) filtering module 51*w* may be also configured and operable to implement any combination of a spatial noise reduction filter, a TIF, and an image stabilization filter that registers between sequential setup imagery such that the BRI image is the most accurate representation of the reference BG scene. A similar image stabilization filter can also be implemented as part of F1 in computing the clutter after such camera vibration effects.

Figure 4F:
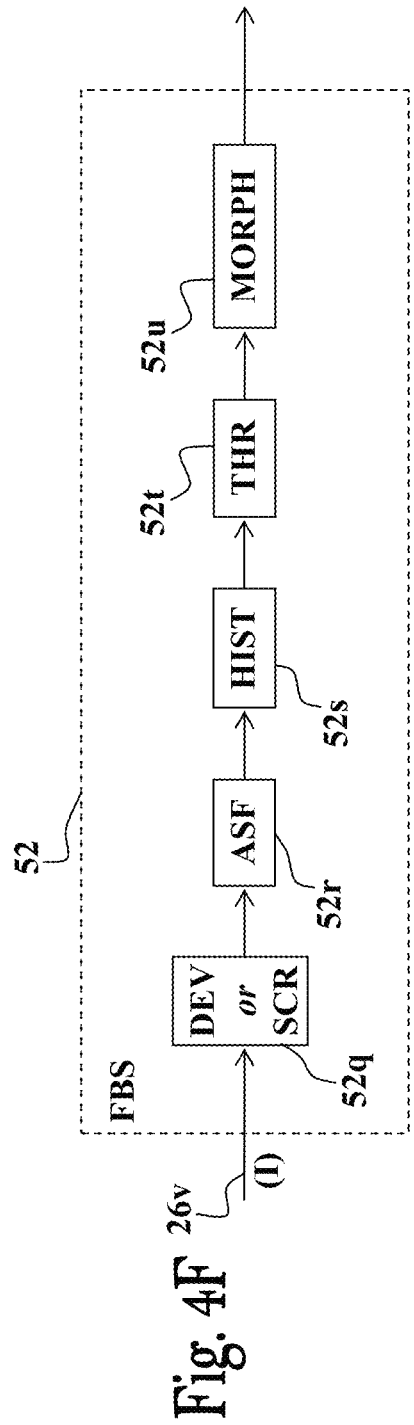
FIG. 4F is a block diagram of a FBS utility usable in an end-to-end video processing applications according to some possible embodiments.

FIG. 4F is a block diagram exemplifying implementation of the FBS utility 52, according to some possible implementations. In this example the BG and FG image data 26*s* of the FBS utility 52 is generated by using a series of image processing modules, as will be now described in details.

The acquired image data (I) of the video session 26*v* is first processed by a deviation analysis module 52*q* (also referred to herein as difference keying module) configured and operable to generate image pixel deviation data. For example, in some embodiments the deviation analysis module 52*q* is configured and operable to apply a pixel-based deviation operator, or a signal to clutter (SCR) operator that is the pixel-based deviation normalized by the localized deviation of the BCM 51*m* e.g., SCR=ABS(I−BRI)/BCM).

The SCR may be computed separately, for example and without being limiting, in the case of the Lab color representation, for the luminance (L) and chrominance (A,B) components, three different SCR values may be computed; an SCR(L), SCR(A) and SCR(B). Alternatively, the respective SCR(L), SCR(A), SCR(B) values may be normalized by a globally computed (i.e., non-pixel based) clutter measure as may be determined from the respective L, A, B histograms. The image pixel deviation data is then provided to an adaptive spatial filter (ASF) module 52*r* configured and operable to improve the tonal pixel distribution of the image pixel deviation data.

The ASF module 52*r* is preferably implemented using a multi-directional multi-dimensional adaptive smoothing method, such as described in U.S. patent Ser. No. 11/991,854, whereby the locally computed SCR and locally computed contrast are used in determining respective adaptive smoothing parameters on a pixel-by-pixel basis. Such smoothing retains the FG-to-BG contrast while fusing together the different parts of often fragmented FG object. The ASF module 52*r* is therefore used to facilitate extraction of the foreground by augmenting the pixel data variance and enhancing/augmenting uniformity of the tonal pixel distribution to thereby permit improved accuracy in determining a threshold to be used by the threshold module 52*t* in the thresholding of the image pixel deviation data in when generating the binary image of said image pixel deviation data.

The spatially filtered image data is then processed by a histogram (HIST) analyzer module 52*s* configured and operable to determine tonal pixel distribution of the received image data and generate histogram data indicative thereof. A thresholding operation is then applied on the image data by a threshold module (THR) 52*t* configured and operable to generate a binary image map based on the histogram data from the histogram analyzer module 52*s*. For example and without being limiting, the threshold module 52*t* may be configured and operable to implement a threshold selection method such as described by Nobuyuki Otsu, in IEEE transactions on systems, man and cybernetics, Vol. SMC-9, No. 1, January 1979, "A Threshold Selection Method from Gray-Level Histograms,". Finally, the binary image map generated by the threshold module 52*t* is processed by a morphological operation (Morph) module 52*u* that fills holes and detaches small false detections.

Figure 5A:
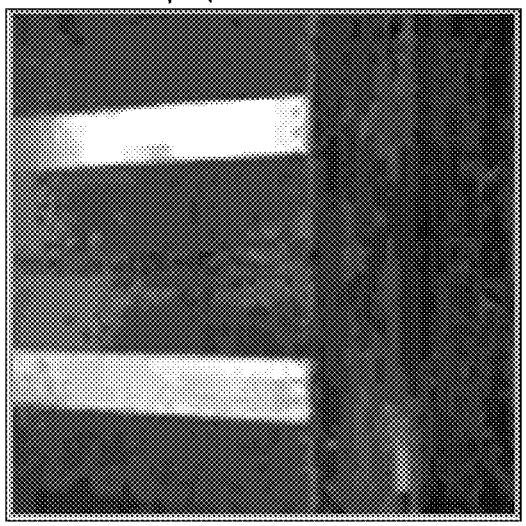
FIGS. 5A to 5N exemplify a process of BG-FG separation, according to some embodiments.
Figure 5B:
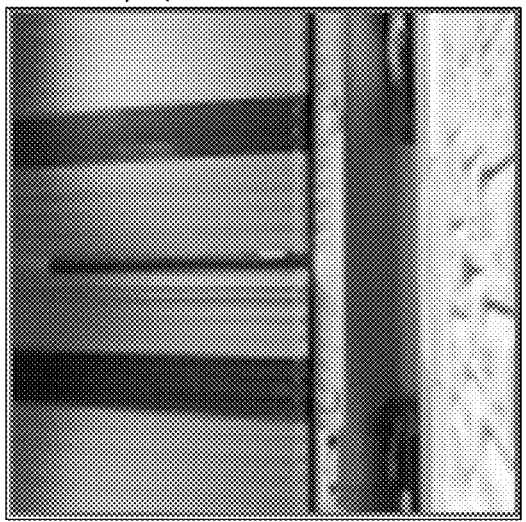
Figure 5C:

FIGS. 5A to 5N exemplify operation of the BG-FG separation step, according to some possible embodiments of the present invention. In this example, the incoming camera video signal is composed of either color RGB components or more typically YCbCr (luminance 'Y' and Chroma components 'Cb' and 'Cr'), which can also be transformed for convenience or improved performance to Lab color representation (Luminance 'L' and Chroma 'A' and 'B' components). FIGS. 5A to 5C show components of Lab color representation of a BRI 51*i* of a setup image 26*u*. More particularly, FIG. 5A shows the 'L' component of the BRI 51*i* (i.e., BRI(L)), FIG. 5B shows the 'A' component of the BRI 51*i* (i.e., BRI(A)), and FIG. 5C shows the 'B' component of the BRI 51*i* (i.e., BRI(B)).

Figure 5D:
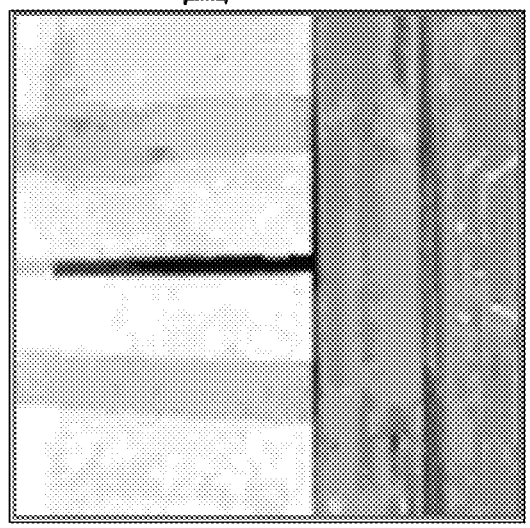
Figure 5F:
Figure 5E:
Figure 5H:
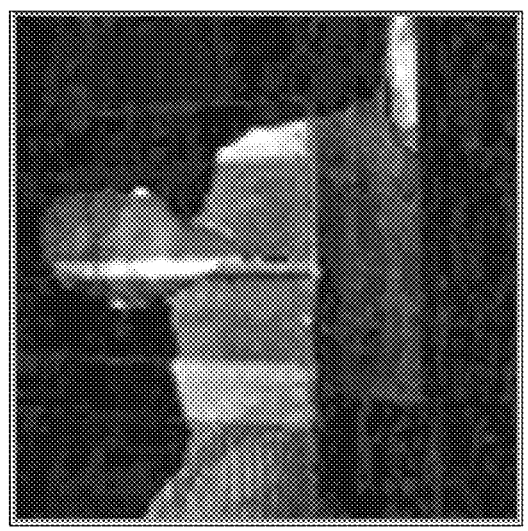
Figure 5G:
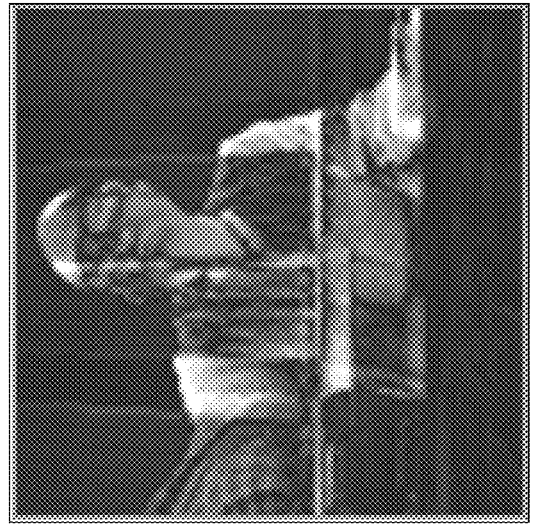

FIGS. 5D to 5F show components of Lab color representation of an image received in the acquired video session 26*v*. More particularly, FIG. 5D shows the 'L' component of the incoming live session video image 26*v* (i.e., I(L)), FIG. 5E shows the respective 'A' component (i.e., I(A)), and FIG. 5F shows the B component of the incoming video image (i.e., I(B)). FIGS. 5G-5H show image data obtained by applying absolute difference operation (DEV or SCR 52*q* in FIG. 4F) to the LAB representation components of the acquired image 26*v*. More particularly, FIG. 5G shows the absolute difference image data AD(L) of the 'L' component of the acquired image 26*v*, calculated using the following operation:

$$AD(L)=ABS[I(L)-BRI(L)]; \text{ and}$$

FIG. 5H shows the absolute difference image data AD(A,B) of the 'A' and 'B' components of the acquired image 26*v*, calculated using the following operation:

$$AD(A,B)=ABS[I(A)-BRI(A)]+ABS[I(B)-BRI(B)].$$

Figure 5J:
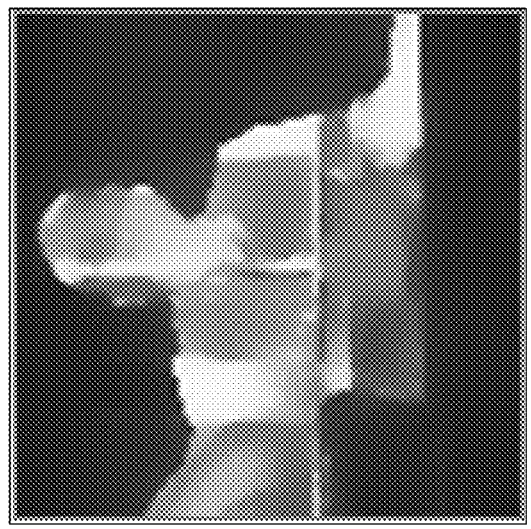
Figure 5L:
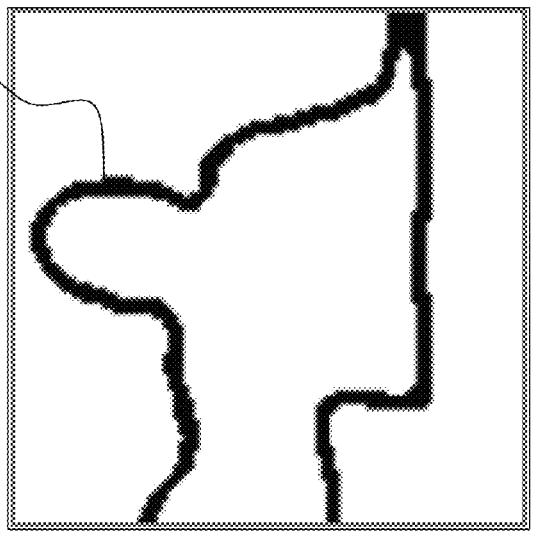
Figure 5I:
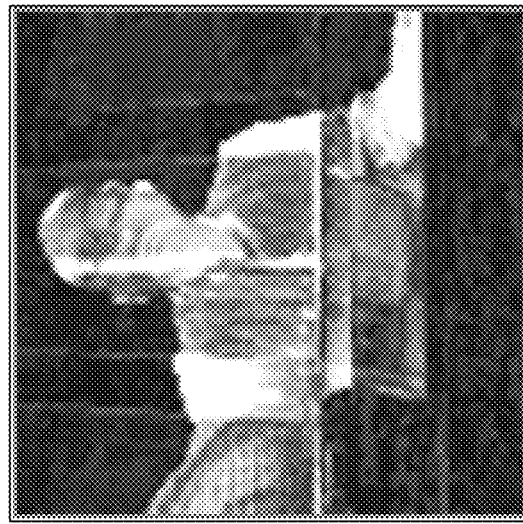

FIG. 5I shows image data obtained by calculating the sum of the absolute difference image data calculated for the 'L' and 'A,B' components, as follows:

$$AD(L,A,B)=AD(L)+AD(A,B).$$

In applications where the luma and chroma components are equally important and informative, the configuration may be such that first the AD(L) and AD(A,B) intermediate results are normalized such that their respective global standard deviations STD(AD(L)) and STD(AD(A,B)) are equated after such normalization prior to being summed, in which case the said normalized result is given by $$NAD(L,A,B)=AD(L)/STD(AD(L))+AD(A,B)/STD(AD(A,B))$$

Effectively, the normalization computations can also be achieved by respective global histogram stretching operations, denoted below as STR for the different computed values, thus the result is denoted as follows:

$$STRAD(L,A,B)=STR1[AD(L)]+STR2[AD(A,B)]$$

FIG. 5J shows the result of an adaptive smoothing filter (ASF 52r) that generally fuses adjoining FG regions and improves the differentiation between the FG and BG regions, by computing the following expression:

$$ASF[STRAD(L,A,B)]$$

Figure 5K:

FIG. 5K shows the result of an exemplary histogram analysis used for determining a Threshold (THR) operation for separating the FG and BG regions by computing the following expression:

$$THR[ASF[STRAD(L,A,B)]],$$

where the threshold may be based on a 2-mode histogram segmentation of the image, as exemplified in FIG. 5N, and where it is noted that the 2 modes of the histogram are better separated after the ASF compared to before as depicted in FIG. 5M, where it is clear that the histogram upper threshold boundary of Mode A in FIG. 5N is more easily determined as compared to the histogram shown in FIG. 5M.

FIG. 5L exemplifies a FG-BG transition region 54 where an exact contour may be further determined, and whereby the transition region 54 is determined by applying, for example and without being limiting, a morphological dilation (widening (W)) operation to the bounding contour, or alternatively, by blurring and thresholding the contour, as follows:

$$W[THR[ASF[STRAD(L,A,B)]]]$$

Figure 6A:
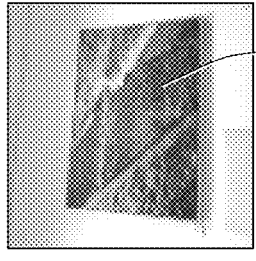
FIGS. 6A to 6R demonstrate a BG-FG separation process based on automatic selection on separation of image color according to some embodiments.
Figure 6B:
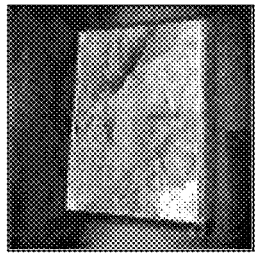
Figure 6C:
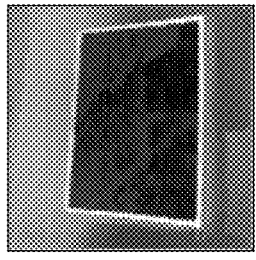
Figure 6D:
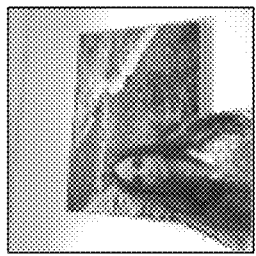
Figure 6E:
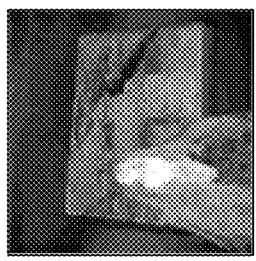
Figure 6F:
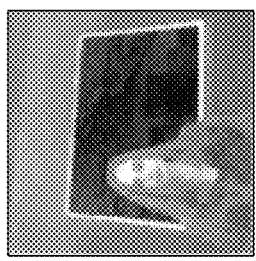
Figure 6G:
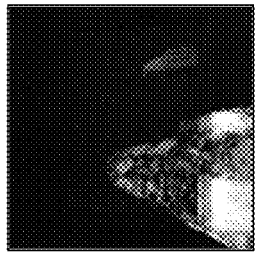
Figure 6H:
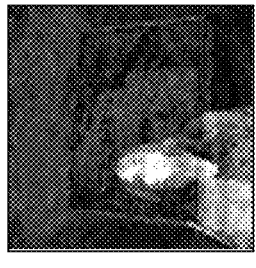
Figure 6I:
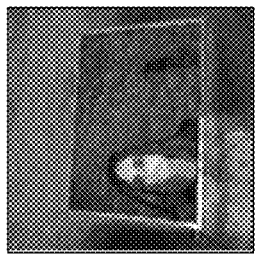
Figure 6J:
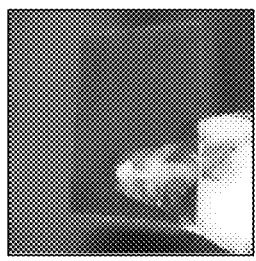
Figure 6K:
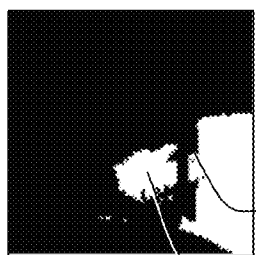
Figure 6L:
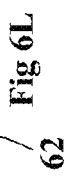
Figure 6M:
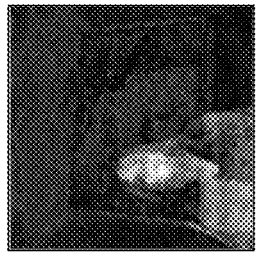
Figure 6N:
Figure 6O:
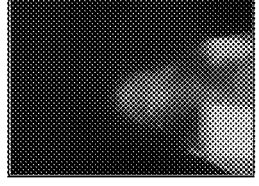
Figure 6P:
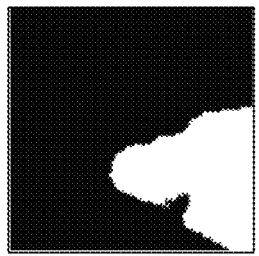
Figure 6Q:
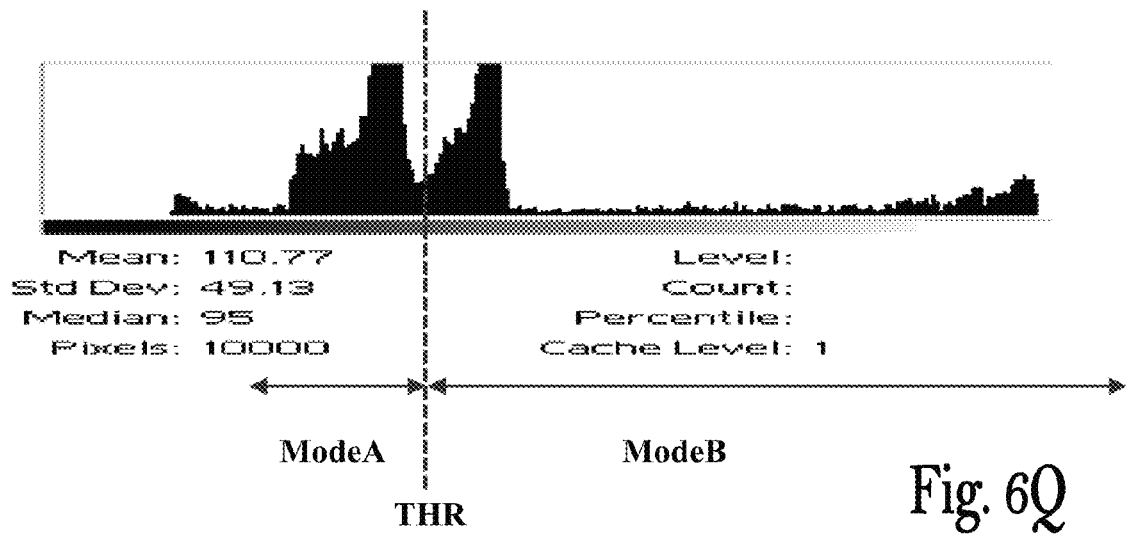
Figure 6R:
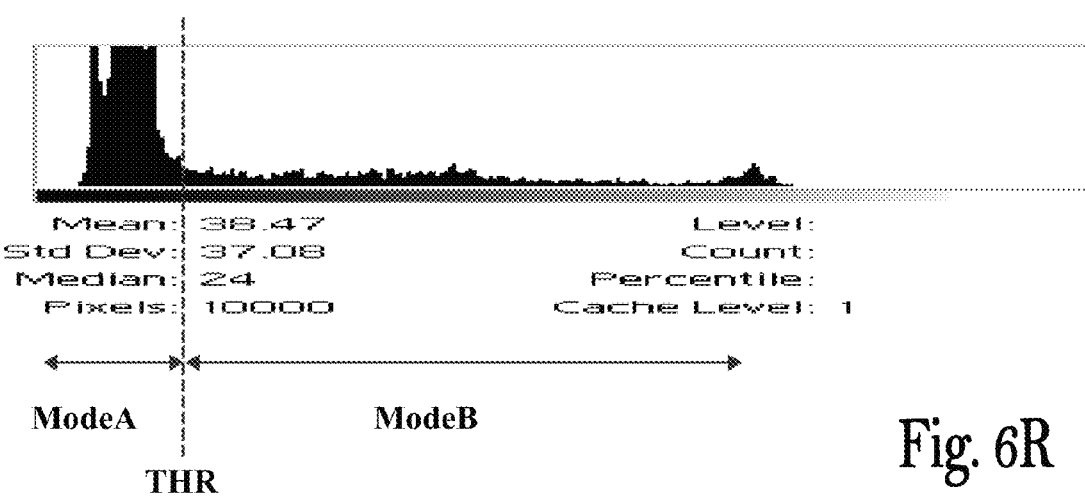

FIGS. 6A to 6R show another example of the functional VS process for the BG-FG separation, according to some possible embodiments of the present invention. This example is more complex, as the BG region is similar to the FG region in parts of the FIG. 60 seen in the BG of the images, thus requiring an additional analysis of the luma and chroma components. For example, and without being limiting, by comparing the respective histograms of the AD(L,A,B), AD(L,A), AD(L, B) and AD(A,B) computations, it may be determined which of the said results provides the best FG-BG 2-mode histogram separation, thereby selecting it for proceeding further in the filtering and thresholding stages. Alternatively, the entire process may be repeated for each such alternative, and the best 2-mode histogram separation may then be selected. The 2-mode separation criterion C may be defined as follows:

$$C=(MN(ModeB)-MN(ModeA))/(STD(ModeB)+STD(ModeA))$$

where MN( ) denotes mean and STD( ) denotes standard deviation of the respective thresholded histogram modes.

Typically the incoming camera video signal 26v is composed of either color RGB components, or more typically, of YCbCr (luminance 'Y' and Chroma components 'Cb') and 'Cr'), which can also be transformed for convenience or improved performance to Lab color representation (Luminance 'L' and Chroma 'A' and 'B' components).

FIGS. 6A to 6C show components of Lab color representation of a BRI 51i of a setup image 26u. More particularly, FIG. 6A shows the 'L' component of the BRI 51i (i.e., BRI(L)), FIG. 6B shows the 'A' component of the BRI (i.e., BRI(A)), and FIG. 6C shows the 'B' component of the BRI (i.e., BRI(B)). FIGS. 6D to 6F show components of Lab color representation of an image received in the acquired video session 26v. More particularly, FIG. 6D shows the 'L' component of the incoming live session video image (i.e., I(L)), FIG. 6E shows the respective 'A' component (i.e., I(A)), and FIG. 6F shows the 'B' component of the incoming video image (i.e., I(B)).

FIG. 6G shows the absolute difference of the 'L' components of the acquired image 26v and of the reference setup image (51i) 26u respectively, computed as follows:

$$AD(L)=ABS[I(L)-BRI(L)];$$

FIGS. 6H and 6I are the absolute differences of the 'A' and 'B' components of the acquired image 26v and of the reference setup image 26u (51i) respectively, computed as follows:

$$AD(A)=ABS[I(A)-BRI(A)]; \text{ and}$$

$$AD(B)=ABS[I(B)-BRI(B)] \text{ respectively.}$$

FIG. 6J shows image data obtained by computing the sum of the absolute differences of the 'A' and 'B' components computed in equations (X1) and (X2) above:

$$AD(A,B)=ABS[I(A)-BRI(A)]+ABS[I(B)-BRI(B)];$$

FIG. 6K shows image data obtained by computation of the stretched STR and filtered ASF sum, as follows:

$$ASF[STRAD(L,A,B)]=ASF[STR1[AD(L)]+STR2[AD(A,B)]];$$

FIG. 6L shows image data resulting from an exemplary histogram analysis for determining a threshold (THR) operation for separating the FG and BG regions, computed as follows:

$$THR[ASF[STRAD(L,A,B)]]$$

where the threshold may be based on a 2-mode histogram segmentation exemplified in FIG. 6Q, and where it is noted that the 2 modes of the histogram are not well separated, as evident in the head 61 of the FG figure being separated from the torso 62. In this example, the 'B' chroma component deteriorates the FG-BG separation, and therefore a better separation is achieved by using only the 'L' and 'A' components.

FIG. 6M shows image data of the AD(A) component only, obtained by computation of the following expression:

$$AD(A)=ABS[I(A)-BRI(A)];$$

FIG. 6N shows image data of the stretched sum obtained by computation of the following expression:

$$STRAD(L,A)]=STR1[AD(L)]+STR2[AD(A)];$$

FIG. 6O shows image data of the stretched STR and filtered ASF sum obtained by computation of the following expression:

$$ASF[STRAD(L,A)]=ASF[STR1[AD(L)]+STR2[AD(A)]];$$

FIG. 6P shows image data resulting from an exemplary histogram analysis for determining a Threshold (THR)

operation for separating the FG and BG regions, obtained by computation of the following expression:

$$THR[ASF[STRAD(L,A)]]$$

As seen, in the obtained results there is clearly better discrimination and separation of the FG from the BG using the histogram shown in FIG. 6R.

Figure 7A:
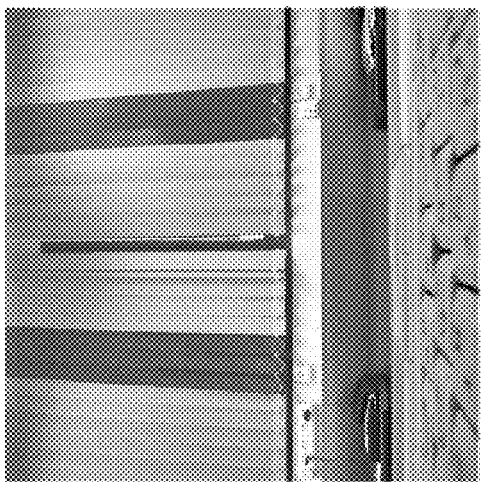
FIGS. 7A to 7F demonstrate a process for correction of BG illumination according to some possible embodiments.
Figure 7B:
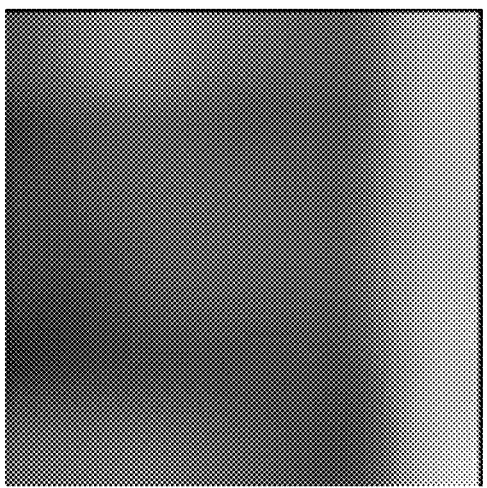

FIGS. 7A to 7F show image data obtained by using the BG illumination correction (23 in FIG. 2 and BIC 23 in FIGS. 4C-D), according to some possible embodiments of the present invention. With reference to FIG. 7A, there is shown the BRI ($51i$) image, in this example, wherein there are illumination non-uniformities (highlights) in the right upper part of the image, and in the close-in keyboard in the lower part of the image which is also highly reflective. FIG. 7B shows the histogram of the L component of the BRI shown in FIG. 7A, wherein the full dynamic range of the pixel levels is utilized.

Figure 7C:
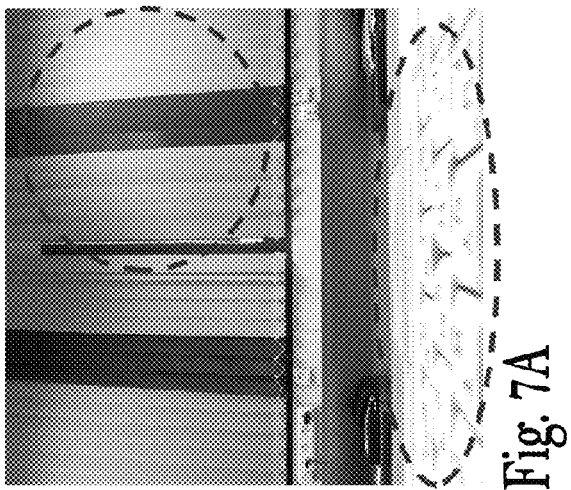
Figure 7D:
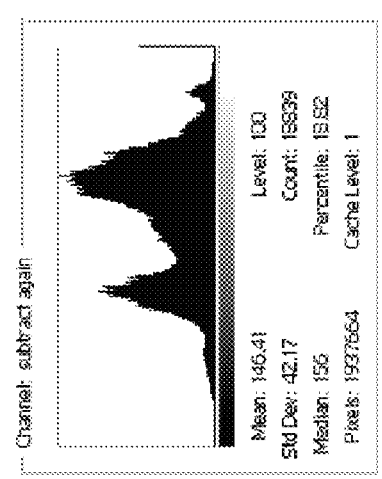
Figure 7E:
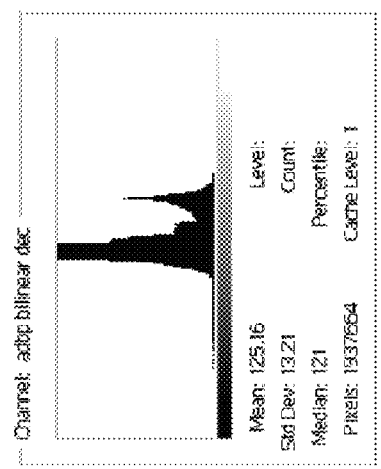
Figure 7F:
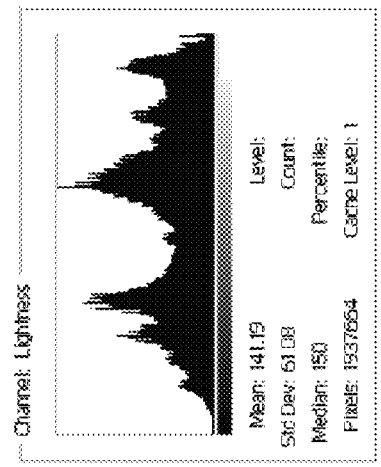

FIG. 7B depicts illumination non-uniformities as determined by an Adaptive Band Pass Filter (ABPF) filter that is applied to BRI image FIG. 7A, such as described in U.S. patent application Ser. No. 11/991,854 of the same applicant hereof the disclosure is incorporated herein by reference, wherein regions with locally slightly differentiated (highlights and shadows) Luminance are determined having a histogram as depicted in FIG. 7D. This illumination non uniformity can be removed from the BRI image by subtracting the ABPF image of FIG. 7B from the BRI image of FIG. 7A, resulting in BRI image data as shown in FIG. 7C wherein the dynamic pixel level range of the corrected BRI is reduced by the removal of such highlights and shadows, as also shown in the histogram of FIG. 7F.

Figure 8B:
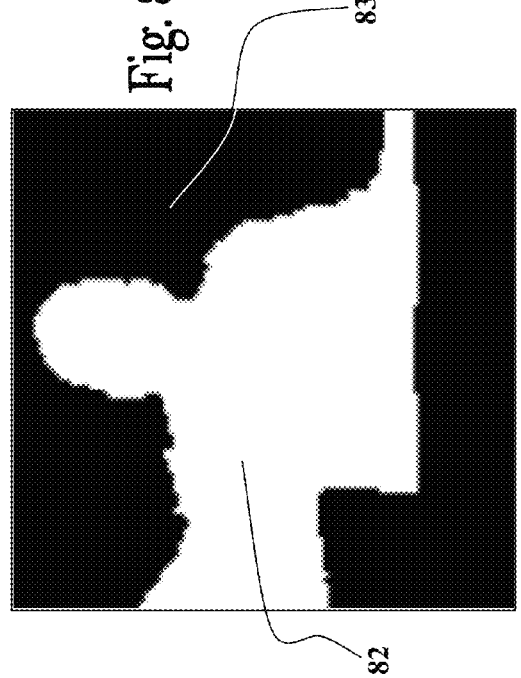
Figure 8A:
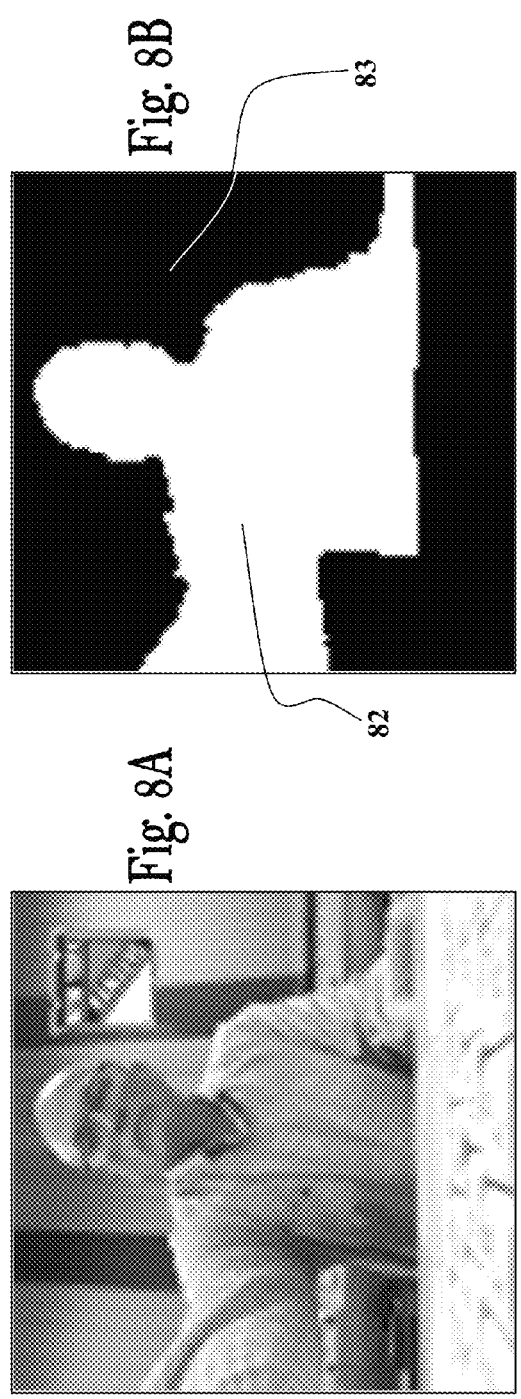
Figure 8D:
Figure 8C:
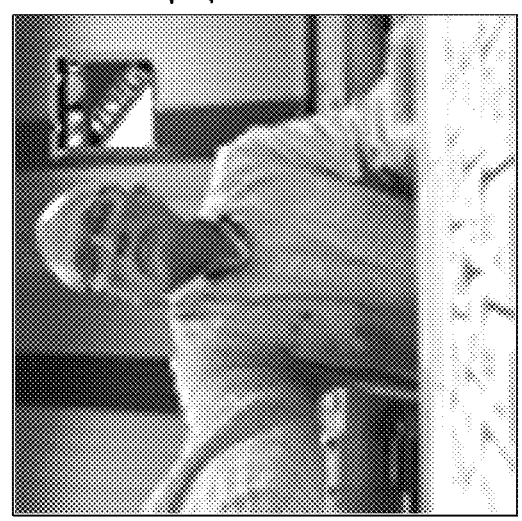

FIGS. 8A to $8i$ demonstrate a FG-BG separation process subsequently followed by a spatially selective application of digital makeup on skin regions which are segmented from within the FG region of the image, according to some possible embodiments of the present invention. In this example, a YCbCr image representation is used for skin tone segmentation. The incoming camera video image data shown in FIG. 8A is composed of YCbCr (luminance (Y) and Chroma components (Cb) and (Cr)). FIG. 8B shows the binary image of the FG-BG separation obtained from the operation of the FBS utility 52, wherein the BG region 83 is black colorized and the FG region is white colorized FIG. 8C shows the Y component of the received image data, FIG. 8D shows the Cr component of said image data, and FIG. 8E shows its Cb component.

According to some embodiments of the present invention the skin segmentation process combines Y, Cr and Cb image components to extract skin regions from within the previously segmented FG region 82. Since the Cr and Cb components are a result of (R−Y) and (B−Y) component differences, a similar differencing is also needed for the Y component. In some embodiments of the present invention this is achieved by the application of a spatial ABPF to the Y component, which essentially differentiates spatially and locally Y regions from their respective neighboring regions. Image data obtained in result of application of the ABPF(Y) is depicted in FIG. 8F, and FIG. 8G shows the normalized Sum (S) of all three components, obtained by computation of the following expression—

$$S=STR1[ABPF(Y)]+STR2[Cr]+STR3[Cb]$$

The STR normalization is similar to that described hereinabove.

Figure 8I:
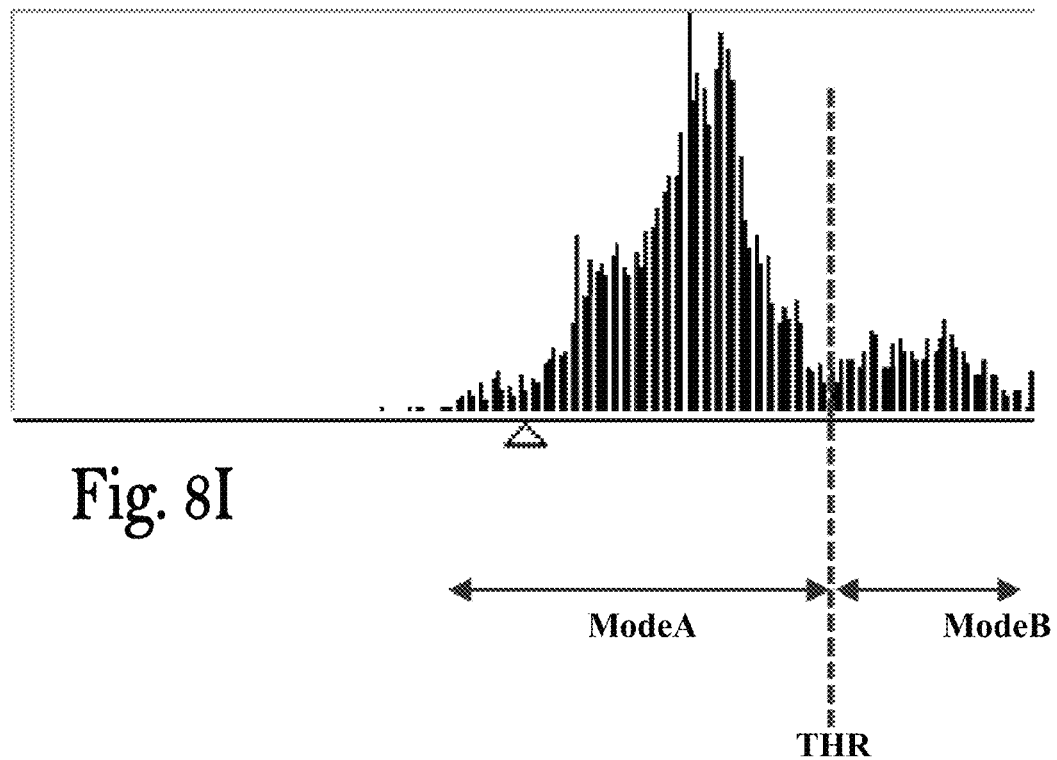

FIG. 8H shows the result of an exemplary analysis of the histogram depicted in FIG. 8I for determining a threshold (THR) operation for separating the skin regions 84 from the previously determined FG region 82, as follows—

$$THR[S\ AND\ FG],$$

where the threshold may be based on a 2-mode histogram segmentation of the image data shown in FIG. 8I. It is noted that the small image regions 84 taken up by skin, are indicative of the savings in computation efforts required for carrying out the digital makeup operation (21 in FIGS. 2, 4C and 4D) on the entire FG region 82.

Another difficulty dealt by the VS system of the present invention relates to FG-BG segmentation in strong shadowing effects conditions (e.g., solar conditions). In such cases, according to some possible embodiments of the present invention, color components of an image are screened prior to combining them in performing the FG-BG separation FBS function.

Figure 9A:
FIGS. 9A to 9I demonstrate a process for subsequent FG-BG separation in strong shadowing conditions in the scene, according to some possible embodiments.
Figure 9B:
Figure 9C:
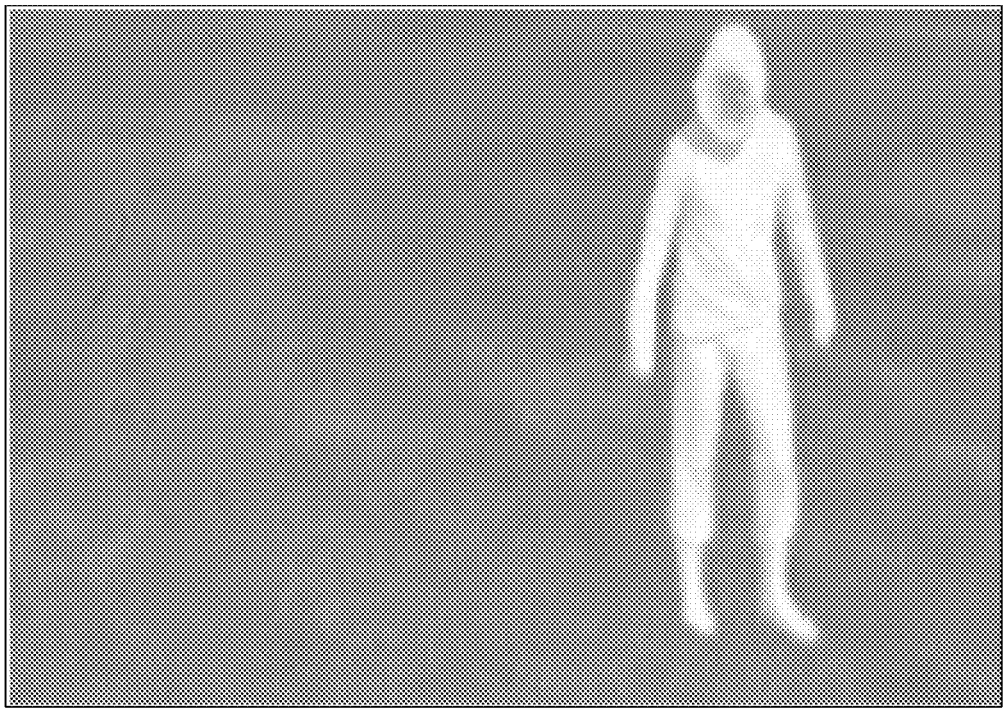
Figure 9D:
Figure 9E:
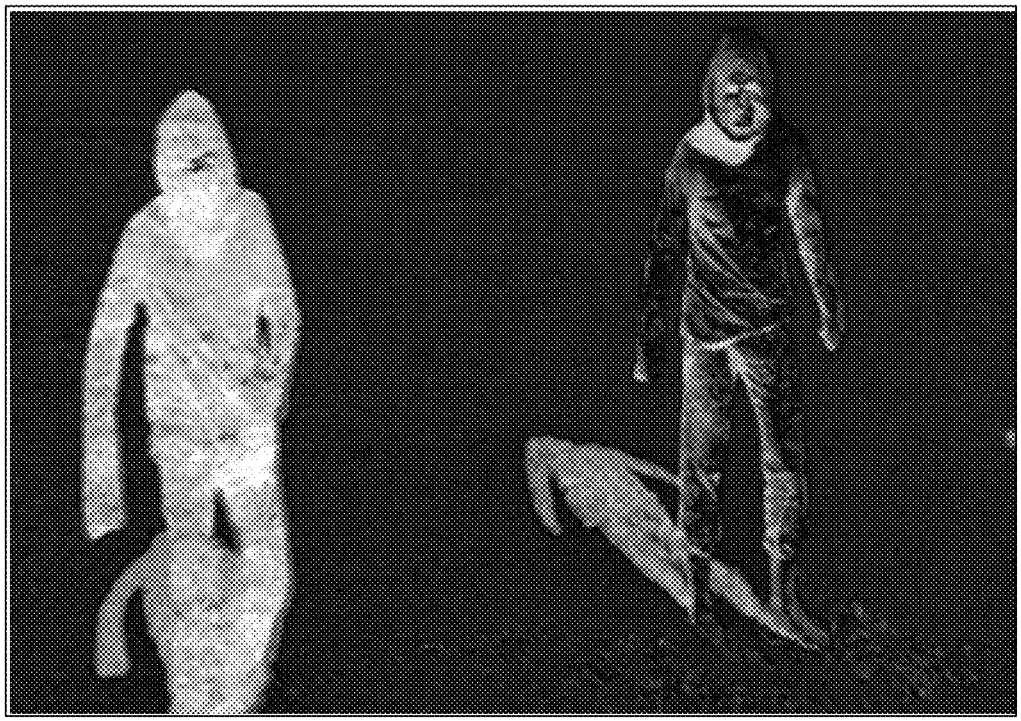

FIGS. 9A to 9G exemplify operation of the FG-BG segmentation of the VS system in strong solar shadowing conditions, according to some possible embodiments. FIG. 9A shows a grayscale representation of an exemplary LAB color image data acquired during a video session, for example. FIG. 9B shows the L component of the acquired image data, FIG. 9C shows its A component and FIG. 9D shows its B component. FIG. 9E shows the histogram stretched absolute difference obtained by computing the following expression—

$$AD(L)=STR[ABS[I(L)-BRI(L)]],$$

Figure 9F:
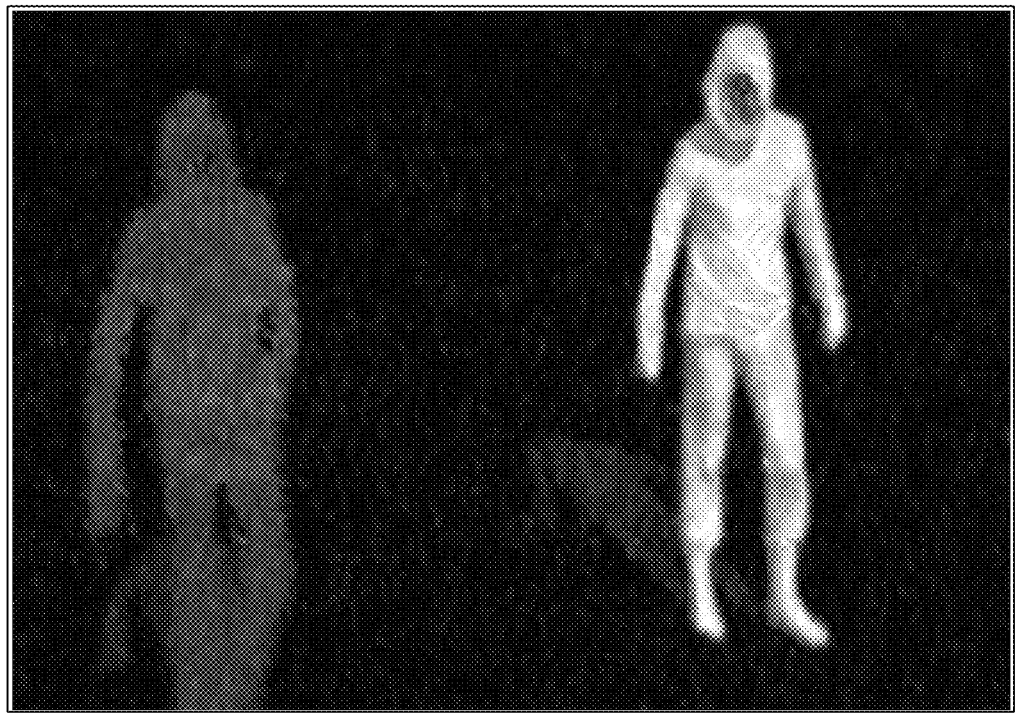

FIG. 9F shows image data obtained from computation of the following sum—

$$AD(A,B)=ABS[I(A)-BRI(A)]+ABS[I(B)-BRI(B)],\ and$$

Figure 9G:
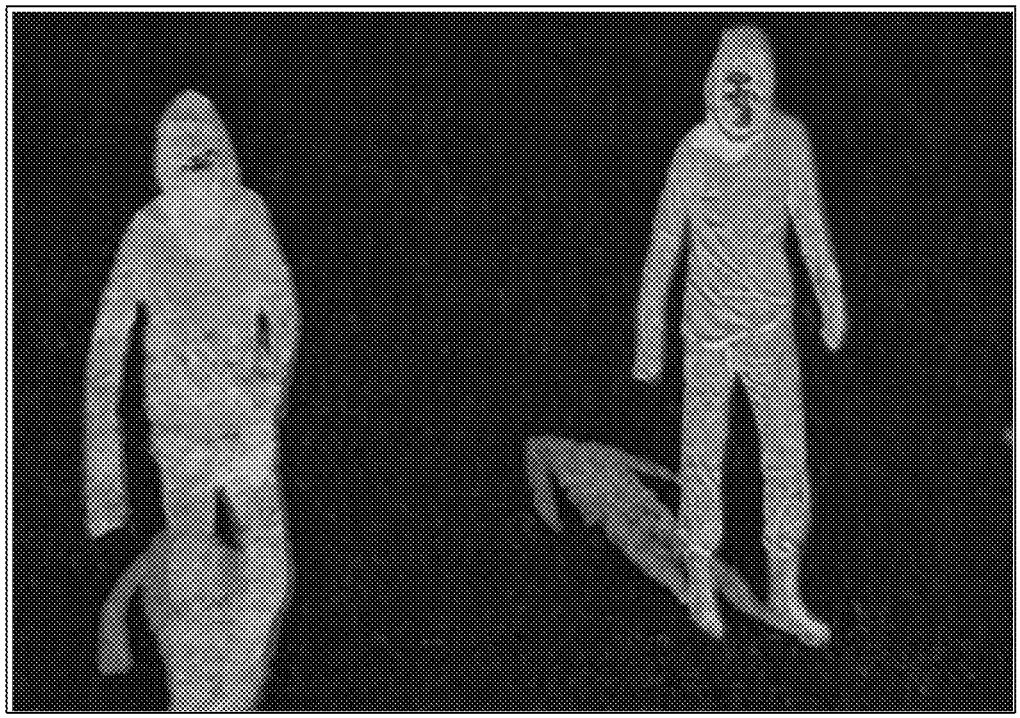

FIG. 9G shows the normalized stretched sum obtained by the following computation—

$$STRAD(L,A,B)=STR1[AD(L)]+STR2[AD(A,B)]].$$

Figure 9H:
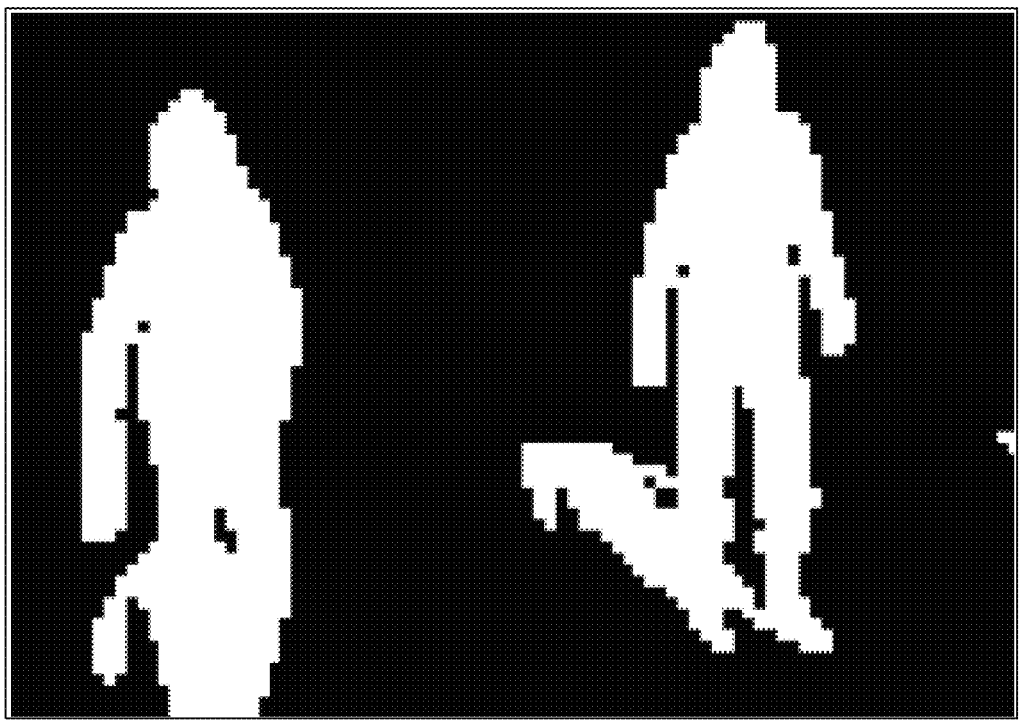

It is noted that shadows are clearly noticeable after carrying out a histogramic thresholding (THR) operation, as exemplified in FIG. 9H, for separating the FG and BG regions, for example and without being limiting, by carrying out the following computation:

$$THR[STRAD(L,A,B)].$$

Figure 9I:
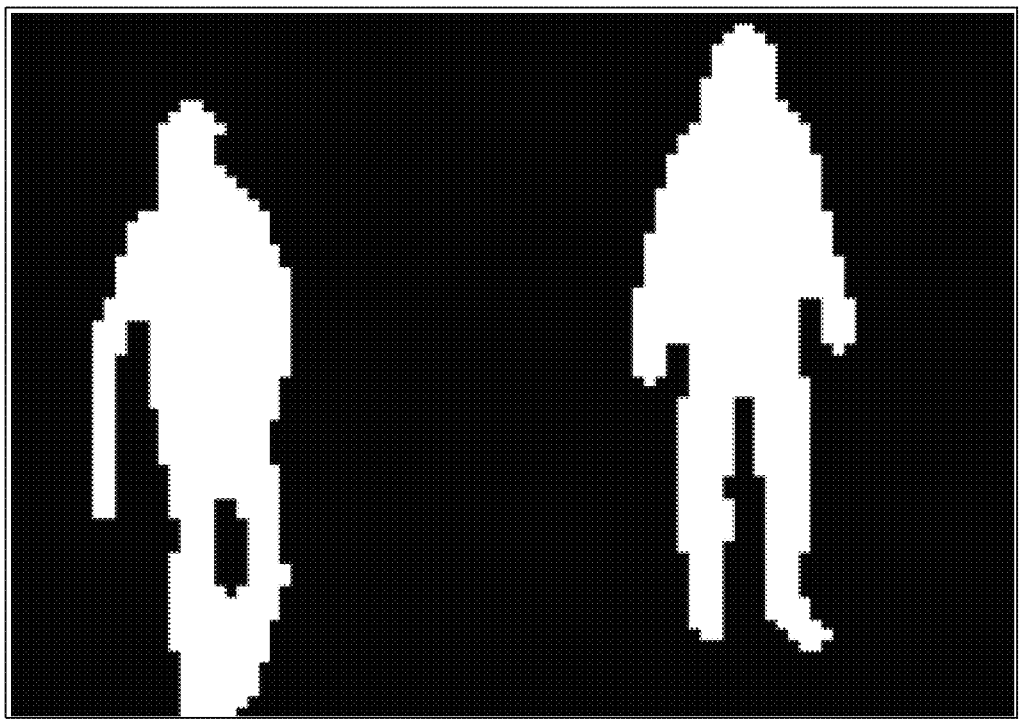

In such cases, according to some possible embodiments, the L component is weakly weighted or not used altogether in the FG-BG segmentation performed by the FBS utility 52, as it is most affected by the shadow effects. For example and without being limited, using only the color components of the acquired image data in the FG-BG segmentation of the FBS utility 52, as follows $$AD(A,B)=ABS[I(A)-BRI(A)]+ABS[I(B)-BRI(B)];$$

$$STRAD(A,B)=STR2[AD(A,B)]];$$

$$THR[STRAD(A,B)],$$

the thresholded result has largely removed the shadow effects, as depicted in FIG. 9I.

According to some possible embodiments of the present invention the VS system is configured to carry out dynamic and adaptive augmentation information overlay (e.g., 2D and 3D graphic elements, imagery, video, and suchlike). As explained hereinabove, the overlaid information may be either user-selected or user-generated information, or otherwise, including any personal favorites and/or advertisements, thereby electively transforming such video based communication platforms (e.g., video conferencing, video calling, video messaging) into corporate and personal revenue generating advertisement channels.

Such user-generated/selected information and advertisements may be manually or automatically activated (i.e., accessed for further information, such as by mouse clicking a HTML link) based on touchless activation (as exemplified in FIG. 10), voice activation, voice recognition activation, optical text recognition (OCR) activated, sound activation, context activation, user and party identities and preferences activation, and such like. Advertisements by nature are rendered in the BG portion of the acquired video images, such that the user or any other foreground static or dynamically changing scene information is not obscured by the information (e.g., advertisement) added to the BG portion of the image.

Figure 10A:
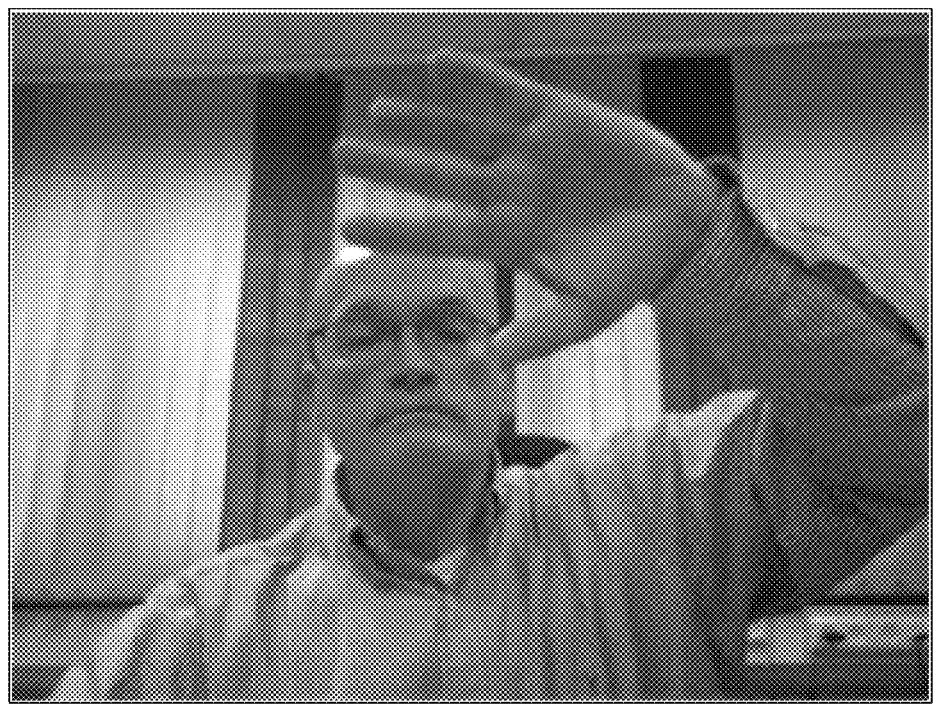
FIGS. 10A to 10E demonstrate a process for touchless sensing and activation of a dynamic advertisement display according to some possible embodiments.
Figure 10B:
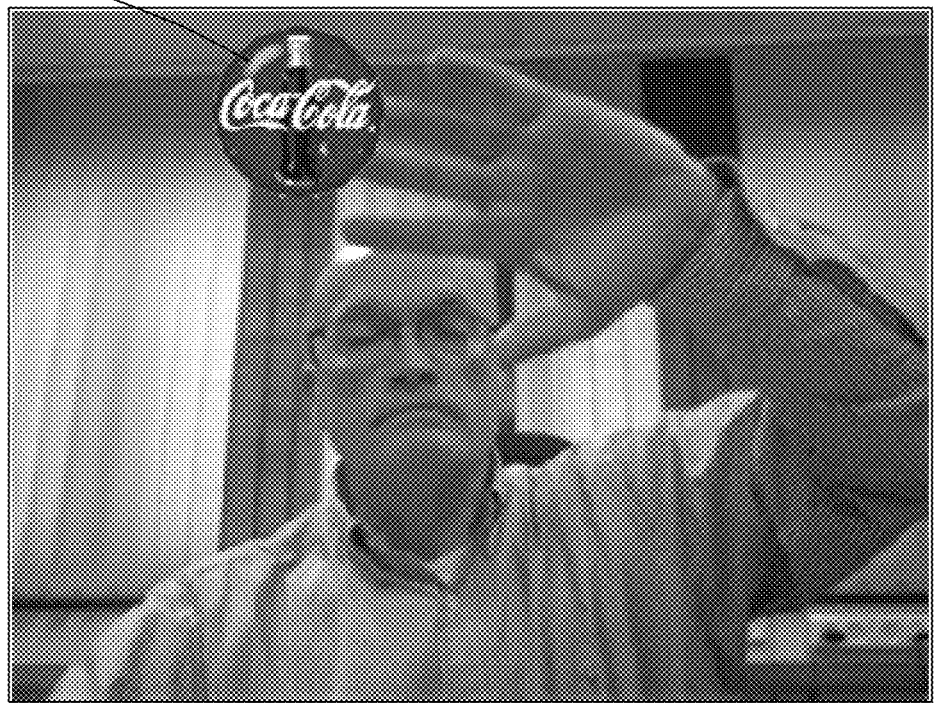
Figure 10C:
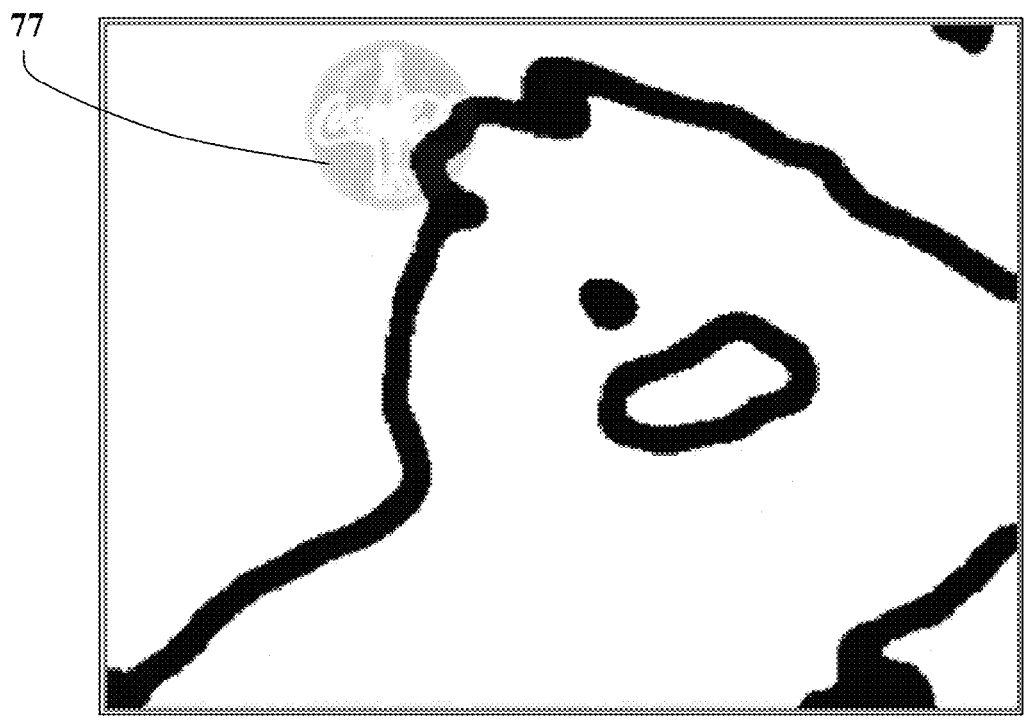
Figure 10D:
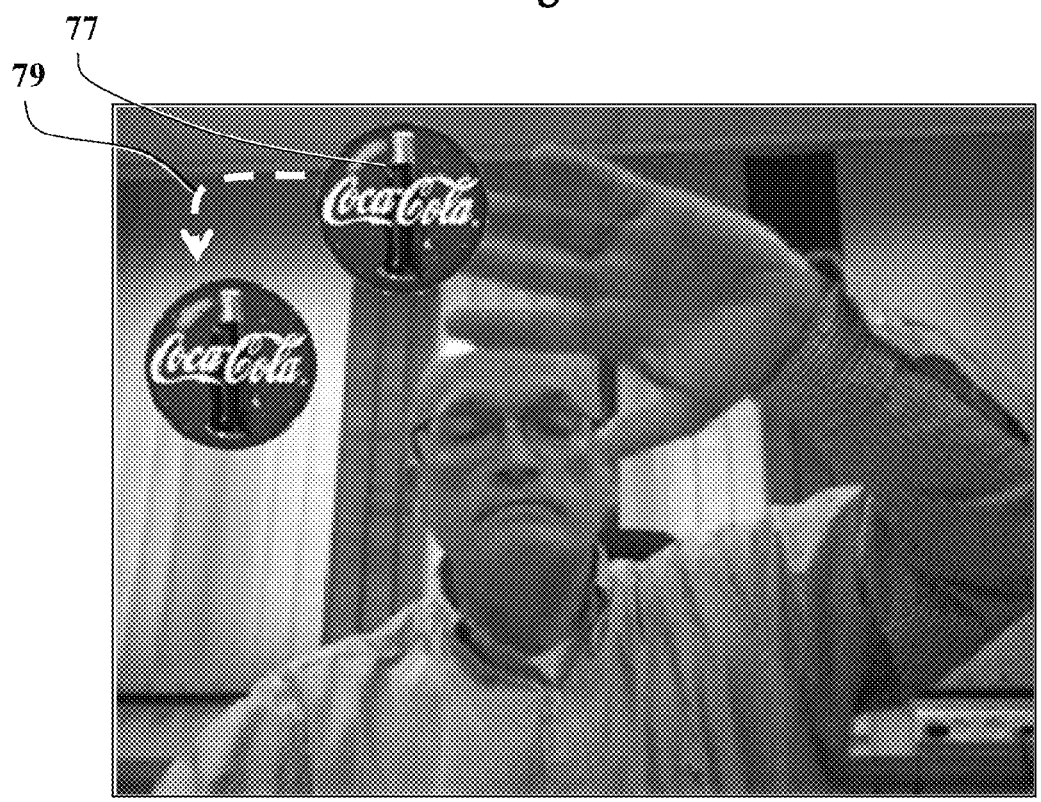
Figure 10E:

FIGS. 10A to 10D exemplify another possible embodiment of the present invention allowing touchless activation of a dynamic advertisement display for various purposes, using the operation of the FBS utility 52. FIG. 10A shows an input live image acquired during the video session. With reference to FIG. 10B, at some point an advertisement 77 is overlaid in the BG portion of the acquired video image. If by chance the user moves around and intermittently obstructs the advertisement 77 as depicted in FIG. 10B, the FBS function can detect such crossing, for example by a simple bit map logical AND operation of the FG boundary and the advertisement pixel region, as exemplified in FIG. 10C. In response to such detection of advertisement obstruction, the advertisement 77 or other graphic element may be moved to an unobstructed location in the FG portion of the image as demonstrated by the broken arrowed line 79 in FIG. 10D, resulting in displacing the advertisement 77 into a new location within the BG portion of the image, as exemplified in FIG. 10E. Such transitions may be performed in a visually pleasing manner, for example by a smooth fade-out, followed by a smooth fade-in in the new location. In this way the advertisement is always seen and is not obstructed by the FG portions of the scene.

It is however noted that such obstruction of the graphical items (e.g., advertisements) immersed/added in BG of the output video images can also be determined as a "click" selection of said graphical items by the user (e.g., by the touchless sensing and activation detector 18t).

Some possible embodiments of the present invention provide automated placement of graphic elements, such as advertisements, in the acquired video image or scene, wherein the placement of said graphic elements may be controlled by the amount of image changes and detected motion of FG objects in the field of view. For example and without being limiting, a region in the acquired scene, image or video, within which no changes or motion is indicated becomes a potential location for a dynamically placed and changing graphic elements/advertisement or user generated information. Such user selected graphic elements/advertisements, for example, may be used to provide credit points to a user of a free video calling application, whereby such free usage is subject to a minimum number of graphic elements/advertisement selections and placements.

In possible embodiments the VS system is configured and operable to permit touchless clicking of graphic elements presented in the image or scene. Such touchless clicking may be used to reflect interest of the user in the graphic/advertisement item, and a request for more information on said item. Moreover, such clicking by an observer of such video calling video or movie clip, for example and without being limiting, may be used to provide credit points to a user of a free video calling application, whereby such free usage is subject to a minimum number of clicks by the observer.

In some applications the FBS utility 52 is used for determining the image regions which effect the camera automatic gain control (AGC) functionality such that the FG portion of the acquired image is optimized for display at the cost of reduced display dynamic range allocated to the BG image portion. Camera focus control can also be controlled in a similar manner, whereby the FG image region is used to determine image acuity, thereby controlling the focus accordingly. Similarly, room and scene illumination may also be controlled, whereby the FG image region is used to determine illumination control such that FG shall be best rendered compared the B G.

In some embodiments of the present invention the FBS 52 and HSS 21h utilities are used for determining the size (e.g., in pixels or connected pixel blobs) used in determining the filtering parameters of the FDM 21 utility. For example, and without being limiting, when the skin and face dimensions are small, the FDM utility 21 is applied lightly, and whenever the dimensions of the skin are large in the field of view, the FDM utility 21 is applied more strongly. This approach provides a more adaptive digital makeup effect, as when face is close to camera, facial imperfections are more clearly noticeable and need stronger concealing and improvement.

Figure 11A:
FIGS. 11A and 11B demonstrate a situation of applying digital makeup on the entire image due to inaccuracies in the FG-BG separation.
Figure 11B:

In some applications the video processing system of the present invention is configured and operable to allow manual override over the DM by the user such that the FDM utility 21 is applied on the entire image (FG and BG portions), whereby HSS information may be used to further provide adaptation to the digital makeup effect. FIGS. 11A and 11B demonstrate a situation wherein such manual override may used due to inaccuracies in the FG-BG separation process. FIG. 11A shows a binary image in which background components 88 were merged into the foreground during the FG/BG separation process, and FIG. 11B shows the results obtained by applying the digital makeup on the entire image. In such cases, according to some embodiments, the video processing system of the present invention applies the digital makeup on the entire image (without the applying FBS separation), or alternatively, the FDM utility 21 is operated to apply the digital makeup on all parts of the image which are designated by the HSS utility 21h, including the head and/or skin as well as some other segmented regions which cannot be differentiated from the head and/or skin areas.

In some possible embodiments of the present invention the FBS utility 52 is used for securing a desktop computer or laptop, whereby any motion or changes detected in the field of view may be monitored, recorded, transmitted for an alarm or control purposes. For example and without being limiting, the FBS utility 52 may be configured to issue such an alarm upon detection of a person seated or moving around or near the desktop computer or laptop.

In yet another possible embodiment the video processing system of the present invention may be configured to monitor workers by their monitors, in determining their movements and gestures.

The video processing techniques of the present invention may be used to solve the problem of poor eye contact in video calling and video conferencing, whereby the eyes of subjects are not directed towards the camera since they are typically directing their gaze towards the other subject who generally appears typically in the middle of the field of view and display. In some embodiments of the present invention, the FBS utility 52 is used to determine the display positioning of the FG region, such that the head of the subject is positioned just under and in maximal proximity to the webcam or camera of the user, such that the user's gaze is directed closer to the camera for better eye contact in a video call and conferencing.

In some other embodiments of the present invention the FBS utility 52 is used to implement an incognito function to video calls and conferencing, such that the user is not clearly recognized, or completely invisible. For example, the HSS 21*h* utility may be used to distort or remove facial components of the foreground, such that the body portion of the user may be observed but not the face, such that the person is seen but not facially recognized.

In some other embodiments of the present invention the FBS utility 52 and HSS 21*h* utility are used to dynamically crop and transmit only head and facial skin regions thereby reducing the amount of transmitted information and required bandwidth.

In yet another possible embodiment of the present invention the FBS utility 52 is used for monitoring motion and changes of foreground components placed in front of the camera, such as a sleeping baby monitoring, for example.

In still yet another possible embodiment of the present invention the BRI image data 51*i*, BCM image data 51*m* and the FBS utility 52 are used for whiteboard copying in meeting rooms, whereby the presenter is removed from the whiteboard scene, thereby enabling the whiteboard information to be continually presented and updated.

In some possible embodiments of the present invention the BRI image data 51*i*, BCM image data 51*m*, FBS utility 52 and the BIC utility 23 are used for overhead document imaging by a webcam, mobile or tablet device, whereby once the document is placed in the field of view of the camera, the FBS process is applied to differentiate between the document FG and BG, thereby saving and transmitting the document only.

Figure 12A:
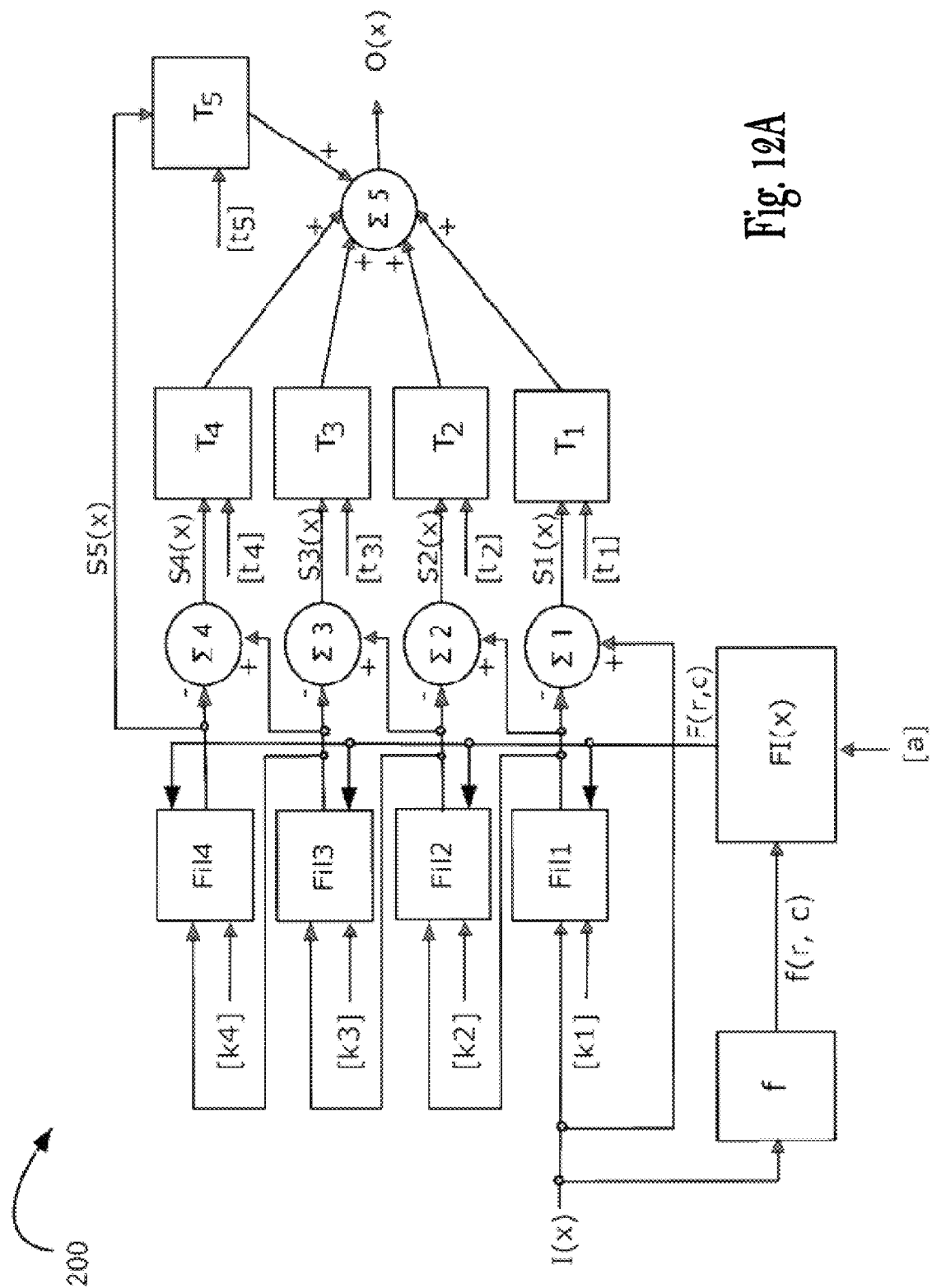
FIGS. 12A and 12B exemplify possible implementations of the digital makeup process according to some embodiments.

FIG. 12A a possible embodiment of a digital makeup (DM) module 200, usable in the FDM utility 21, according to some embodiments of the present invention. The DM module 200 is configured and operable for altering skin (e.g., facial) features in input image data I(x) so as to apply digital makeup using a plurality of filters (Fil1, Fil2, Fil3, Fil4) which operate together to decompose the input image data I(x) into a plurality of output signals (S1($x$), S2($x$), S2($x$), S3($x$), S4($x$), S5($x$)) which are transformed (T1, T2, T3, T4) and added (Σ5) to produce together a final output data (output image O(x)), where the filters are configured such that their strengths are dependent on a localized feature of the input image calculated on a pixel by pixel basis. The localized feature may be determined pixel-by-pixel, or for different groups of adjacent pixels. In the latter case, the group of pixels may form a shape which is oriented according to a desired structure of the image (e.g., it may be oriented along an edge or contour). The group of pixels may be chosen according to the luminescence and/or the chrominance of the image. The localized feature may have high resolution (the same feature is common to a low number of adjacent pixels), a low resolution (the same feature is common to a low number of adjacent pixels), or a medium resolution therebetween.

The DM module 200 is typically used to alter the original parts of the input image I(x) in which skin of foreground objects is seen, such as faces. The alterations in some examples of the present invention generally relate to improving/enhancing the face in the image. However, the DM module 200 may be used to deteriorate the image, or to alter it in other manners (e.g., aging, simulating facepaint or creating a cartoon-like image).

The DM module 200 generally comprises data processing and analyzing utility (software and/or hardware) including a high-pass filtering module, at least one band-pass filtering module, a low-pass filtering module, a feature computation module f, a strength computation module FI(x), at least one transformation module—five such modules being shown in the present not limiting example T1-T5, and a summation unit Σ5. The high-pass filtering module formed by a smoothing filtering utility Fil1 and a subtractor Σ1, which subtracts the output of the first smoothing filtering utility Fil1 from the input signal I(x), is configured for outputting a high-pass signal indicative of at least edges and/or contours of the face in the input signal I(x).

The band-pass filtering module is configured for receiving data indicative of the input signal (i.e., the input signal I(x) itself or any functional thereof resulting from filtering the input signal by one or more intermediate filters) and outputting a bandpass signal indicative of low-contrast slowly-varying qualitative features of the face. The band-pass filtering module includes the respective smoothing filtering utility and the respective subtractor (Σ2, Σ3, Σ4), which subtracts the output of the respective smoothing filtering utility from the output of a previous smoothing filtering utility forming a previous filtering module. Thus, for example, the first Band-Pass filter module includes the filtering utility Fil2 and the substractor Σ2, and the subsequent Band-Pass filtering module includes the filtering utility Fil3 and the substractor Σ3.

The low-pass filtering module is configured for receiving data indicative of the input signal (i.e., the input signal I(x) itself or any functional thereof resulting from filtering the input signal by one or more intermediate filters), and outputting a low-pass signal in which low-contrast regions are smoothed, while high-contrast regions are preserved. In this example the low-pass filtering module is the last band-pass filtering module comprising the filtering utility Fil4.

The feature computation module f is configured for receiving the input signal I(x) and calculating a localized feature of the image for a plurality of pixels of the image. The strength computation module FI(x) is configured for receiving the localized feature resulting from the feature computation module f, using the localized feature for determining a localized operand to determine a strength of the filtering module at the plurality of the pixels, and transferring the localized operand to the filtering modules. The transformation modules T1, T2, T3 and T4 are configured for altering at least a portion of at least one of the following signals: high-pass signal, at least one bandpass signal, and low-pass signal. The summation module Σ5 is configured for receiving the high-pass signal, the at least one bandpass signal, and the low-pass signal after at least a portion of at least one of these signals has been altered by the at least one transformation module, and for summating the received signals together, thus yielding an output signal (image data O(x)) indicative of a characteristic of an altered image.

The localized operand F(r, c) from the feature computation module f is fed into filtering utilities Fil1, Fil2, Fil3, and Fil4. Each filtering utility is associated with a corresponding individual global parameter (k1, k2, k3, and k4) each being indicative of the strength of the smoothing filter function applied by each of the filtering utilities, and modifying the localized operand F(r, c) to determine the strength of each smoothing filter at each pixel. In other words, all the filtering utilities apply coarser smoothing filters in low-contrast regions and finer smoothing filters in high-contrast regions, because of the localized operand F(r, c). However, the actual strengths of the different filters at a given pixel may be different from each other, since—for each filter—the localized operand is individually modified in a different manner by the respective global parameters (k1, k2, k3, and k4).

For example and without being limiting, the DM module 200 may receive an input signal I(x) which is to be processed and which is indicative of an image including at least a part of a human face. The system operates to filter the input image data aimed at altering (e.g., improving) the face's image. The input signal I(x) is actually in the form of image data presented by a matrix of pixels and is thus indicative of a characteristic (e.g., intensity or value) of the image at each pixel. Each pixel in the matrix may be denoted using its row (r) and column (c) numbers in the matrix.

Initially, the input signal is analyzed by the feature computation module f which calculates, for each pixel of the image (having position defined by a row r and a column c), a localized feature F(r, c) of the image. In a non-limiting example, the localized feature may be a gradient of the characteristic of the image, or a local maximum of local gradients. If the characteristic is the intensity, then the gradient of the intensity is larger in the regions in which the contrast is higher. The localized feature F(r, c) is then fed into the strength computation module FI(x), which uses the localized feature and an adaptive operand [a] for the filtering operation to compute a localized operand F(r, c) which controls the strength of the smoothing on each pixel. In general, the localized operand F(r, c) is such that regions with high contrast are finely smoothed, while regions in which the contrast is lower are more coarsely smoothed. Regions of the image in which the contrast is higher are the regions of contours and edges, which generally contribute to the vitality and acuity of the face's image.

The localized operand F(r, c) is fed into the high-pass filtering module, one or more bandpass filtering modules, and the low pass filtering module. In each filtering module, the localized operand F(r, c) is used to calculate a parameter of each of these filters that the respective filtering module will apply on the input image. The filtering modules decompose the input signal into component signals $S1(x)$ to $S5(x)$. In this example $S1(x)$ is a high-pass signal, $S2(x)$, $S3(x)$, and $S4(x)$ are the bandpass signals, and $S5(x)$ is the low-pass signal. The signal $S1(x)$ is a signal which retains the fine detail of the image, i.e., the signal $S1(x)$ is indicative of an image where high-contrast regions are retained, while other regions are attenuated. The output of each bandpass filtering module is a signal indicative of an image in which certain imperfections of the face are retained, while others are smoothed out. Finally, $S5(x)$ is the low-pass (pedestal) signal, which retains the low frequency base signal of the image, but where all the details are blurred.

At least one of the computed signal components $S1(x), \ldots, S5(x)$ is received by a respective transformation module (T1, ..., T5). Each transformation module may alter the respective component signal via an offset (bias) function, a gain (stretching) function and/or a thresholding function. Optionally, these functions are constant gain functions provided by predetermined operators. Alternatively, these functions are dependent on the signal component, and may be determined via histogram analysis (mean, standard deviation, thresholded levels such as for example tail outlier values, linear and non-linear mappings etc) of the signal components $S1(x), \ldots, S5(x)$. Finally, the transformed component signals are added together by the summation module Σ5 to provide an output signal O(x).

In some embodiments of the present invention, the transformation module T1, acting on the high-pass signal $S1(x)$, increases the weight of the signal S1 relative to the other signals. In this manner the output image is characterized by higher vitality, while the facial imperfections are attenuated.

The global parameters, when applied to the operand F(r, c) in each pixel are of lower complexity as compared to the local operands F(r, c). Thus using the global parameter to vary a local operand which is calculated once for each pixel requires less processing than calculating the local operand for each filter, for each pixel. In this manner, the computational process for determining the strengths of the multiple filters at each pixel is accelerated.

In some embodiments of the present invention, the signal I(x) is received by each of the filtering utilities and filtered. In some embodiments of the present invention, the filtering utilities use respective multi-directional/dimensional adaptive filters (MDAFs) and optionally different combinations of non-adaptive finite-impulse-response (NAFIR) filters and/or adaptive finite-impulse-response (AFIR) filters and/or infinite impulse response (IIR) MDAF, depending on the type of operation or facial image effect desired to separate and process. Because the filters are calculated simultaneously, this embodiment of the present invention enables parallel processing by all filtering utilities, thereby enabling more effective real time implementations with minimum latency in multi processors or multi core processors. Optionally, at least some of the MDAFs are IIR MDAF's, and the calculation of the pixel characteristic at each, is performed as described above.

In another non-limiting example, in each filtering utility, the MDAF at each pixel depends on a localized feature that applies to all respective directions at that pixel. Thus, it is not necessary to calculate the filtering strength of each ODAF of the MDAF for a plurality of directions. Rather, the localized feature determines a single strength for all the ODAFs which form a specific MDAF at any given pixel.

In one such case, the localized feature F(r, c) is determined by identifying the local maximum of such characteristic of the image within a local region of N pixels' size in the vicinity of said pixel (r,c) (e.g., the maximum in the absolute differences between the intensity at the pixel (r, c) and the intensity of each of the surrounding pixels). In this manner, the localized feature F(r, c) is computed once for all directions of a given pixel, and requires in turn fewer operations and becomes less processor-intensive and thus faster.

In some embodiments of the present invention, successive filtering utilities provide increasingly smoothing (stronger) filters. For example, k1<k2<k3<k4. The output of the first filtering utility Fil1 and the input signal I(x) are received by the first subtracting utility Σ1, which subtracts the output of the first filtering utility Fil1 from the input signal I(x). This subtraction forms an adaptive high-pass filter, which yields the component signal $S1(x)=I(x)-MDAF_1(x)$. The signal S1 is a signal which retains the fine detail of the image, i.e., the signal S1 is indicative of an image where high-contrast regions are retained, while other regions are attenuated. Similarly, additional adaptive bandpass (surface) filters may be achieved by additional subtractions effected by additional subtracting utilities Σ2, Σ3, and Σ4. For example, subtracting utility Σ2 receives $MDAF_1(x)$ from the filtering utility Fil1 and $MDAF_2(x)$ from the filtering utility Fil2, to yield the component signal $S2(x)=MDAF_1(x)-MDAF_2(x)$. Finally, $S5(x)$ is the low-pass (pedestal) signal component exiting the $MDAF_4$ filter of the filtering utility Fil4. Thus, the output of each bandpass filter is a signal indicative of an image in which certain imperfections of the face are retained, while others are smoothed out. Optionally, utility Fil1 applies a non adaptive FIR (NAFIR) filter, such as a Gaussian smoothing filter, which is effective in preserving edge and contour high frequency image detail in the differenced signal component S1(x).

One or more of the computed signal component $S1(x), \ldots, S5(x)$ is received by a respective transformation modules T1, . . . , T5. The transformation module may alter the respective component signal via an offset (bias) function, a gain (stretching) function and/or a thresholding function. Optionally, these functions are constant gain functions provided by predetermined operators. Alternatively, these functions are dependent on the signal component, and may be determined via histogram analysis (mean, standard deviation, thresholded levels such as for example tail outlier values, linear and non-linear mappings etc) of the signal components $S1(x), \ldots, S5(x)$ signals. Finally, the transformed component signals are added together by the addition module Σ5 to provide an output signal O(x).

In some embodiments of the present invention, the transformation module T1 acting on the high-pass signal S1(x) increases the weight of the signal S1 relative to the other signals. In this manner the output image is characterized by higher vitality, while the facial imperfections are attenuated.

In a non-limiting example of the present invention, for each ODAF of the MDAFs the output signal ODAF(r, c) can be expressed as follows:

$$ODAF(r,c)=\alpha(r,c)\cdot I(r,c)+(1-\alpha(r,c))\cdot O(r-i,c-j)$$

The i and j indexes denote the direction of the ODAF in the image, while α(r, c) is the operand that reflects the strength of the specific filter and depends on the local abruptness or edge structure of the pixel (r, c).

In abrupt pixel change locations (high contrast regions) the ODAF will attempt to smooth less, while in smooth image regions the ODAF will attempt to smooth more.

In a non-limiting example, the adaptive operand α(x) can be expressed as follows:

$$F(r,c)=\exp(-f(r,c)/\alpha)$$

$$\alpha(r,c)=\phi(F(r,c),k) \text{ where } k \text{ ranges between } 0<k<2$$

F(r, c) is the feature computed in each image pixel, where a (the adaptive operand input into the strength computation unit FI(x)) is a constant value indicative of a noise level or signal level, depending whether one seeks to overcome noise by adaptive smoothing, or seeks to separate local signal amplitude variation components that represent clutter, image texture of interest etc, φ (F(r, c), k) is a function of F(r, c) and k, and $$f(r,c)=\max[\text{abs}((I(r,c)-I(r-1,c-1))),\text{abs}((I(r,c)-I(r-1,c))),\text{abs}((I(r,c)-I(r-1,c+1))),\text{abs}((I(r,c)-I(r,c-1))),\\ \text{abs}((I(r,c)-I(r,c+1))),\text{abs}((I(r,c)-I(r+1,c-1))),\text{abs}((I(r,c)-I(r+1,c))),\text{abs}((I(r,c)-I(r+1,c+1)))]$$

over a neighborhood of eight pixels.

While in this example, F(r, c) is calculated in a window composed by nine pixels forming a square, larger and/or differently designed local windows may be used. A non-limiting example of a window is a window oriented in various directions such as vertical, horizontal, and +45 degrees and −45 degrees orientations, whereby gradients are summed separately for each orientation and the orientation which generates the maximum value is selected for F(r,c) for that pixel in best estimating the edge feature.

The computed F(r,c) value and the a value are used in determining the exponential function F(r,c)=exp(−F(r,c)/a). This function is typically computationally expensive, and may be performed once for all possible values of −F(r,c)/a, which are then optionally loaded onto a lookup table (LUT).

Next, for each of the filters Fil1, Fil2, Fil3, Fil4, the respective F1(r,c), F2(r,c), F3(r,c), F4(r,c) (and thus the respective α1(r,c), α2(r,c), α3(r,c), α4(r,c)) values are determined using a preferred piecewise linear transformation that requires far less complexity than recalculating the exponential function for each pixel and each filter. For a certain α1(r,c), this transformation is computed as follows (and similarly for the other filters as well):

If (F(r,c)<0.5)
F1(r,c)=k1·F(r, c)
α1(r,c)=1−F1(r, c)
Else
F1(r, c)=φI(F(r, c),k)=(2−k1)·F(r,c)+k1−1
α1(r, c)=1−F1(r, c)
for k values ranging between 0<k<2

Thus, when k is below 1, the adaptive filter acts as a "finer" filter, which tracks the incoming signal edges more rapidly and smoothes them less. If k is above 1, the adaptive filter functions as a "coarser" filter, which tracks the incoming signal edges less rapidly and smoothes more. Thus, for all filters and all pixels, the adaptive smoothing operands α1(r,c), α2(r,c), α3(r,c), α4(r,c) are determined and used in determining the respective ODAFs and respective MDAFs:

$$ODAF1(r,c)=\alpha1(r,c)\cdot I(r,c)+(1-\alpha1(r,c))\cdot O(r-i,c-j)$$

$$ODAF2(r,c)=\alpha2(r,c)\cdot I(r,c)+(1-\alpha2(r,c))\cdot O(r-i,c-j)$$

$$ODAF3(r,c)=\alpha3(r,c)\cdot I(r,c)+(1-\alpha3(r,c))\cdot O(r-i,c-j)$$

$$ODAF4(r,c)=\alpha4(r,c)\cdot I(r,c)+(1-\alpha4(r,c))\cdot O(r-i,c-j)$$

In another embodiment of the present invention, the localized feature F(r, c) is designed such that at pixels with abs(F(r,c))<a the α(r,c) will be small thereby filtering more strongly, and when abs(F(r,c))>a the a(r,c) will be higher thereby filtering less strongly, thereby providing a more abrupt adaptation of the α(r,c) parameter depending on whether F(r,c) values are well below a or above a. An example of such feature is as follows:

$$F(r,c)=(\text{abs}f(r,c)^m/(\text{abs}f(r,c)^m+a^m)=(1+(a/\text{abs}(f(r,c)))^m)$$

$$\alpha(r,c)=F(r,c)$$

where a and F(r,c) are as provided above, and m is a slope factor of said function within the range between 0 and a. The advantage of this function in the context of facial image improvement is that it will smooth more strongly the subtle facial imperfections while retaining more effectively the sharpness of stronger detail. For this embodiment, each of the filters receives increasing a factors, thus shifting the smooth transition range of the respective filter to higher values of F(r, c) than the preceding one hence making the respective filter to smooth stronger.

In another non-limiting example, well-known gradient operators and edge detection filters may be used to score pixels in terms of their "edginess" (e.g., a Sobel filter, which is often used in edge detection), and use this measure to control α(x).

Image segmentation techniques may also be used to segment local image regions, thereby determining the transition pixels between such adjoining areas, and avoiding their smoothing.

In this example, the filtering modules are arranged in series of the DM module 200 are connected in series. Thus, except for the last filtering module, the output of any filtering module is filtered by a successive filtering module. The bandpass filters and the low pass filter are implemented by applying a subsequent filter to the output of the preceding filter, and thereafter differencing them. The adaptive high-pass component signal is thus $S1(x)=I(x)-MDAF_1(x)$, and the adaptive bandpass (surface) component operate as follows (exemplified for $S2(x)$):

$$S2(x)=MDAF_1(x)-MDAF_2(MDAF_1(x))$$

The low-pass (base) component signal exiting the filtering unit Fil4 is:

$$S5(x)=MDAF_4(MDAF_3(MDAF_2(MDAF_1(x))))$$

This configuration enables pipeline processing of all MDAF filters, enabling effective real time implementations with multi processors or multi core processors. This configuration, however, may be riddled by some latency. Advantageously, the k values may be selected according to need and application, and need not be ordered in increasing values.

It should be noted that while in the example of FIG. 12A, four filtering utilities are present, the scope of the invention is not limited to this example as well as any other number of filtering utilities, and generally two or more filtering utilities may be used. Moreover, the filtering utilities of the above examples applied at least one MDAF to the received signals. This might not be the case. In fact, in some embodiments the filters implemented by the filtering utilities may include MDAFs, and/or MDAIIRs and/or NAFIRs, AFIRs etc, depending on the type of operation or image effect desired to separate and process. For example, the filter $MDAF_1$ applied by the filtering utility Fil1 may be replaced by a linear filter such as a Gaussian or a box filter, such that the $S1(x)$ signal is a linear high-pass component signal.

The elements (modules/utilities) of the DM module 200 may be implemented as hardware and/or software elements of a data processing and analyzing utility running respective algorithms on a processor.

The output image $O(x)$ may be expressed as follows:

$$O(x)=T5[Fil4(Fil3(Fil2(Fil1)))]+T4[Fil3(Fil2(Fil1))-Fil4(Fil3(Fil2(Fil1)))]+T3[Fil2(Fil1)-Fil3(Fil2(Fil1))]+T2[Fil1-Fil2(Fil1)]+T1[I-Fil1]$$

When all T transformations are unity (i.e., transparent), the result is $O(x)=I(x)$. Thus the transformation of at least one of the component signals is necessary in order to alter the input image.

Figure 12B:
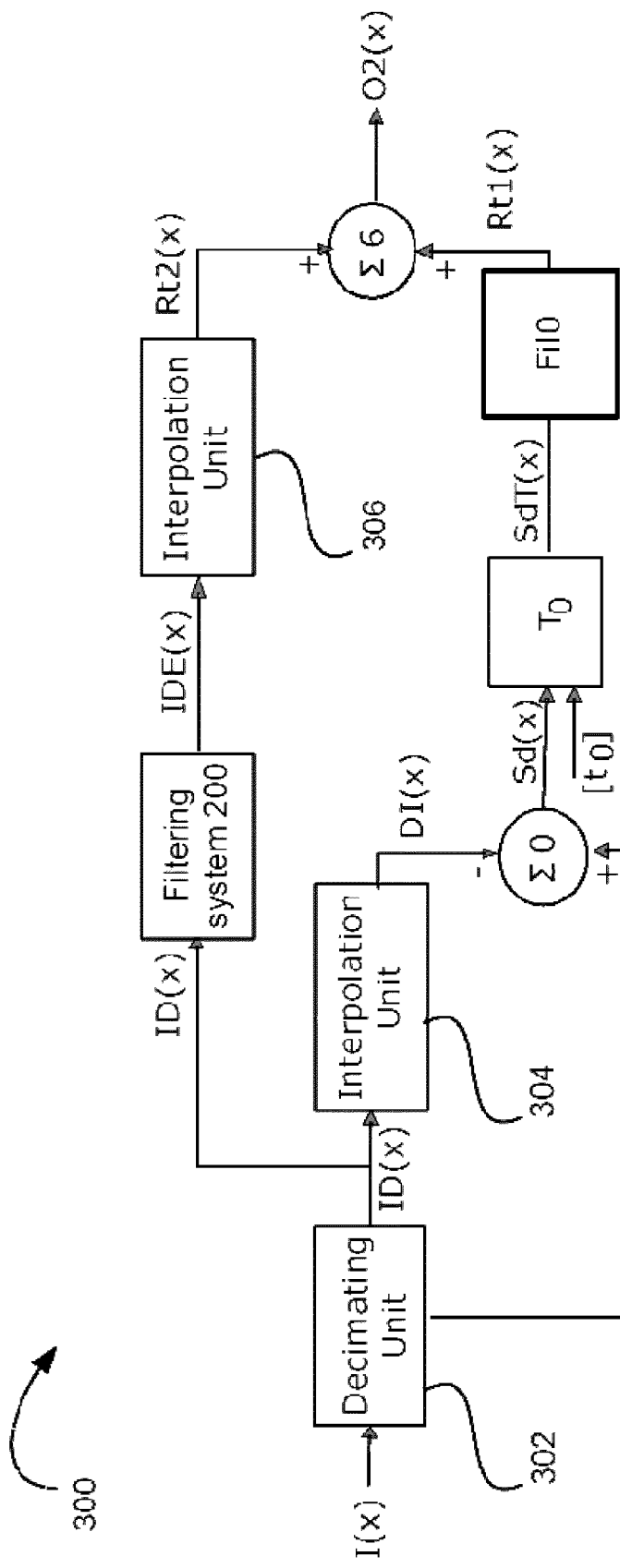

FIG. 12B is a block diagrams exemplifying of a digital makeup module 300 for processing an image of a human face, according to some possible embodiments of the invention. In the module 300 the input image $I(x)$ is processed along two different paths, and the outputs of the two processing paths are combined to yield an output image. The first path generally includes a linear filter, while the second path includes the digital makeup module 200 described hereinabove with reference to FIG. 12A.

In FIG. 12B, the signal $I(x)$ indicative of the input image is received by a decimating unit 302, which reduces the size of the image, and thus removes a portion of the data contained in the signal $I(x)$, to output the decimated signal $ID(x)$ indicative of a decimated image. The decimated signal is then processed in two different threads/routes.

In the first thread, an interpolation unit 304 is used to increase decimated image to the input image original size by interpolation. Thus, the signal $ID(x)$ outputted by the interpolation unit 304 is indicative of an interpolated image having the size of the input image. In the interpolated image, the characteristic (value or intensity) of the pixels where the missing data was previously located is interpolated according to the characteristic of the surrounding pixels. Thus, the decimation and interpolation of the input image results in a smoothed image. The interpolated signal $DI(x)$ and the input signal $I(x)$ are received by a subtracting module $\Sigma 0$, where $DI(x)$ is subtracted from $I(x)$ to produce a difference signal $Sd(x)$. Optionally, the difference signal passes through the transformation module T0, which applies a transformation thereon (similar to the transformation modules described above), and outputs as the transformed difference signal $SdT(x)$.

In the second thread, the decimated signal $ID(x)$ is processed by the digital makeup module 200 (indicated as filtering system 200 in FIG. 12A) described above with reference to any one of FIG. 12A, producing a resulting signal $IDE(x)$ which corresponds to the signal $O(x)$. The signal $IDE(x)$ is then interpolated by a second interpolating module 306, thus yielding the interpolated signal $Rt2(x)$ indicative of an image having the same size as the input image. Optionally, the signal $Sdt(x)$ from the first thread is summed with the signal $Rt2(x)$ from the second thread by an addition module $\Sigma 6$ resulting in the output signal $O2(x)$, which can be converted into an output image. Alternatively, the signal $Sdt(x)$ may be further processed by a filtering utility Fil0 such as a MDAIIR, thereby further reducing residual noise in the detail signal component, and the signal $Rt1(x)$ is yielded. In the latter case, the signal $Rt1(x)$ is summed with the signal $Rt2(x)$ by the addition module $\Sigma 6$ resulting in the output signal $O2(x)$.

The decimation (down sampling) and interpolation (up sampling) by the decimating modules 302 and the interpolating modules 304 and 306 may be bilinear or of a higher order.

In the module 300, the first thread produces the signal $SdT(x)$ (or $Rt1(x)$) which is generally indicative of the details (contours, edges) of the face while attenuating the rest of the image. This is because the signal $Sd(x)$ (from which the signals $SdT(x)$ and $Rt1(x)$ derive) is a difference between data indicative of the input image and data indicative of a smoothed image, thus being a high-pass signal. Thus, the first thread is a high-pass filter. In the second thread, the facial information to be retouched is processed. Thus, in the module 300, detail information is processed differently from the facial information to be retouched, and the output signal therefore retains the acuity that may be otherwise lost in the retouching process of the second thread.

The module 300 may provide processing acceleration as (a) the intensive processing of the module 200 is applied to a smaller image, and (b) image resizing operations (e.g. decimators and interpolators) are implemented in advanced processors (e.g. multi core digital signal processors (DSPs)) in real-time accelerated (e.g. dedicated hardware) configurations, thereby enabling more complex operations to be handled by software-based DSP cores of said processors. At the same time, the details of the image are still maintained (and may even be accentuated via the transformation module T0), thanks to the processing along the first thread.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A computerized system for real-time processing of video data, the system comprising a processor utility comprising:

a reference data module configured and operable to provide reference data comprising reference image data of background within a region of interest and clutter image data indicative thereof;

a pixel deviation calculator configured and operable to receive at least one image of said video data, and process said at least one image utilizing said background reference image data and said clutter image data to determine a pixel deviation level of each pixel in said at least one image and generate pixel-deviation image data indicative thereof;

a filtering module configured and operable to enhance tonal pixel distribution in the pixel-deviation image data and generating enhanced image data;

a binary image generator configured and operable to process the enhanced image data and determine a threshold level based on the tonal pixel distribution, and generate a binary image map being indicative of the background and foreground components of said at least one image.

2. The system of claim 1, wherein the reference image data module is configured and operable to receive input data of a background image of the region of interest from which foreground components were removed, generate the background reference image data, and determine pixel clutter level of each pixel in the background reference image and generate the clutter image data indicative thereof.

3. The system of claim 1, wherein said filtering module comprises a histogram stretching module configured and operable to process the pixel-deviation image data by stretching a color histogram thereof, thereby enhancing the tonal pixel distribution in the pixel-deviation image data.

4. The system of claim 1 wherein the binary image generator comprises a morphological operation module configured and operable to fill holes and detach false detections.

5. The system of claim 1 comprising an image background editing unit configured and operable to modify the background of the at least one image based on the binary image map and generate modified background image data indicative thereof.

6. The system of claim 1 comprising an image foreground editing unit configured and operable to modify the foreground components of the at least one image based on the binary image map and generate modified foreground image data indicative thereof.

7. The system of claim 6 comprising: an image foreground editing unit configured and operable to modify the foreground components of the at least one image bases on the binary image map and generate modified foreground image data indicative thereof; and an image combining unit configured and operable to combine the modified background image data and the modified foreground image data and generate a modified image of the at least one image.

8. The system of claim 1 wherein the reference data module is configured and operable to determine the pixel clutter level using successive image filtering stages comprising a first filtering stage to attenuate low frequency components in said background image and generate filtered background image data indicative thereof, and a second filtering stage to perform temporal integration filtering operation on said filtered background image data.

9. The system of claim 8 wherein the reference image data module comprises a module for determining an absolute value of each pixel in the filtered background image data for use in the second filtering stage.

10. The system of claim 8 wherein the first filtering stage is configured to perform at least one of the following filtering operations: spatial high pass filter; temporal high pass filter; spatio-temporal high pass filter; spatial band pass filter; temporal band pass filter; spatio-temporal band pass filter.

11. The system of claim 1 wherein the reference image data module is configured and operable to generate background reference image data using a temporal integration filter to filter the background image.

12. The system of claim 5 wherein the image background editing unit comprises a background manipulation module configured and operable to perform at least one of removing, replacing and augmenting, the background of the at least one image.

13. The system of claim 5 wherein the image background editing unit comprises a background illumination correction module configured and operable to generate illumination correction data usable for correcting illumination non uniformities in the background of the at least one image.

14. The system of claim 5 wherein the image background editing unit comprises a background stabilization module configured and operable to generate offset data indicative of background offsets induced in the at least one image due to camera movements.

15. The system of claim 14 wherein the pixel deviation calculator is configured and operable to use the offset data in the pixel deviation level computation to compensate the camera movements.

16. The system of claim 5 wherein the image background editing unit comprises a background graphic overlay module configured and operable to introduce graphical items in the background of the at least one image.

17. The system of claim 6 wherein the image foreground editing unit is configured and operable to perform digital makeup to one or more regions of the foreground.

18. The system of claim 17 wherein the image foreground editing unit comprises a skin segmentation module configured and operable to identify skin regions of a user in the foreground portion of the at least one image, and selectively apply the digital makeup to said skin regions.

19. The system according to claim 16 comprising touchless sensing detector configured and operable to detect body gestures of a user in the foreground of the video images towards the graphical items in the background of the at least one image.

20. The system of claim 1 wherein the pixel deviation calculator is configured and operable to generate the pixel-deviation image data by normalization according to respective histogramic standard deviation of at least one of said luminance and Chroma components of said reference image data.

21. The system according to claim 20 wherein the standard deviation is implemented by at least one of the following operations: histogramic stretching and factorization by predetermined gain factor.

22. A method for real-time processing of video data comprising:

receiving reference data comprising reference image data of background within a region of interest and clutter image data indicative thereof;

receiving at least one image of said video data and processing it utilizing said background reference image data and said clutter image data to determine a pixel deviation level of each pixel in said at least one image and generate pixel-deviation image data indicative thereof;

processing the pixel-deviation image data to enhance its tonal pixel distribution and generating enhanced image data;

processing the enhanced image data and determining a threshold level based on the tonal pixel distribution;
generating a binary image map being indicative of the background and foreground components of said at least one image;
manipulating at least one said background and foreground components.

\* \* \* \* \*